US012567359B2

(12) United States Patent
Guo et al.

(10) Patent No.: US 12,567,359 B2

(45) Date of Patent: Mar. 3, 2026

(54) PIXEL CIRCUIT, METHOD FOR DRIVING PIXEL CIRCUIT, DISPLAY PANEL AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Yonglin Guo, Beijing (CN); Haijun Qiu, Beijing (CN); Ming Hu, Beijing (CN); Zhiliang Jiang, Beijing (CN); Gukhwan Song, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 78 days.

(21) Appl. No.: 18/692,706

(22) PCT Filed: Sep. 30, 2022

(86) PCT No.: PCT/CN2022/123155

§ 371 (c)(1),
(2) Date: Mar. 15, 2024

(87) PCT Pub. No.: WO2024/065636

PCT Pub. Date: Apr. 4, 2024

(65) Prior Publication Data

US 2025/0140164 A1 May 1, 2025

(51) Int. Cl.

*G09G 3/32* (2016.01)
*G09G 3/3233* (2016.01)

(52) U.S. Cl.

CPC ............. *G09G 3/32* (2013.01); *G09G 3/3233* (2013.01); *G09G 2310/0286* (2013.01);
(Continued)

(58) Field of Classification Search

None
See application file for complete search history.

(56) References Cited

U.S. PATENT DOCUMENTS

2011/0080395 A1* 4/2011 Chung ................. G09G 3/3233 345/76
2013/0002616 A1 1/2013 Kim et al.
(Continued)

FOREIGN PATENT DOCUMENTS

CN 104380368 B 8/2016
CN 111435587 A 7/2020
(Continued)

OTHER PUBLICATIONS

Definition floating node, downloaded from www.jedec.org/standards-documents/dictionary/terms/floating-node, 1 page (Year: 2014).*

*Primary Examiner* — Dorothy Harris

(74) *Attorney, Agent, or Firm* — Nath, Goldberg & Meyer; Joshua B. Goldberg

(57) ABSTRACT

A pixel circuit, a method for driving the same, a display panel and a display apparatus, the pixel circuit includes: a light-emitting device; a driving transistor coupled to the light-emitting device; a first control circuit coupled to a gate of the driving transistor; a second control circuit coupled to a first setting electrode of the driving transistor and configured to initialize the first setting electrode of the driving transistor before the light-emitting device is driven to emit light; a third control circuit coupled to the driving transistor and configured to reset the gate of the driving transistor, control the data voltage to be input into the gate of the driving transistor, and control the driving transistor to generate an operating current according to a data voltage to drive the light-emitting device to emit light.

19 Claims, 15 Drawing Sheets

(52) U.S. Cl.
CPC ... *G09G 2310/061* (2013.01); *G09G 2310/08* (2013.01); *G09G 2320/0247* (2013.01); *G09G 2330/021* (2013.01)

(56) References Cited

U.S. PATENT DOCUMENTS

| | | | | |
|---|---|---|---|---|
| 2015/0049126 | A1* | 2/2015 | Jung | G09G 3/3233 315/172 |
| 2015/0269885 | A1* | 9/2015 | Ma | G09G 3/3233 345/205 |
| 2018/0151650 | A1* | 5/2018 | Ha | H10D 30/673 |
| 2019/0130830 | A1* | 5/2019 | Han | G09G 3/3233 |
| 2022/0148506 | A1* | 5/2022 | Yuan | G09G 3/3233 |
| 2022/0148508 | A1* | 5/2022 | Chi | G09G 3/3233 |
| 2022/0343823 | A1* | 10/2022 | Wang | G09G 3/32 |
| 2022/0358879 | A1* | 11/2022 | Wang | G09G 3/3233 |
| 2023/0042966 | A1* | 2/2023 | Huangfu | G09G 3/3258 |
| 2023/0137517 | A1* | 5/2023 | Fu | G09G 3/20 345/214 |
| 2023/0377519 | A1* | 11/2023 | Ge | G09G 3/3233 |

FOREIGN PATENT DOCUMENTS

| | | | | |
|---|---|---|---|---|
| CN | 111627387 | A | 9/2020 | |
| CN | 112102785 | A | 12/2020 | |
| CN | 112116893 | A | 12/2020 | |
| CN | 112365844 | A | 2/2021 | |
| CN | 111179855 | B | 3/2021 | |
| CN | 113948038 | A | 1/2022 | |
| CN | 114758617 | A | 7/2022 | |
| WO | WO-2021258915 | A1 * | 12/2021 | G09G 3/3208 |
| WO | WO-2022082751 | A1 * | 4/2022 | G09G 3/2007 |

* cited by examiner

PIXEL CIRCUIT, METHOD FOR DRIVING PIXEL CIRCUIT, DISPLAY PANEL AND DISPLAY APPARATUS

This is a National Phase Application filed under 35 U.S.C. 371 as a national stage of PCT/CN2022/123155, filed Sep. 30, 2022, the content of which is hereby incorporated by reference in its entirety.

TECHNICAL FIELD

The present disclosure relates to the field of display technologies, and in particular to a pixel circuit, a driving method, a display panel and a display apparatus.

BACKGROUND

Light emitting devices such as Organic Light-Emitting Diodes (OLEDs), Quantum Dot Light-Emitting Diodes (QLEDs), Micro Light-Emitting Diodes (Micro LEDs), and Mini Light-Emitting Diodes (Mini LEDs) have the advantages of self-illumination, low energy consumption, and the like, and are one of the hotspots in the application and research field of the display apparatus today. In general, a light-emitting display apparatus employs a pixel circuit to drive a light-emitting diode to emit light.

SUMMARY

The pixel circuit provided by the embodiment of the disclosure includes:

- a light-emitting device;
- a driving transistor coupled to the light-emitting device and configured to generate an operating current for driving the light-emitting device according to a data voltage;
- a first control circuit coupled to a gate of the driving transistor and configured to reduce a leakage current at the gate of the driving transistor based on a signal at a leakage adjustment signal terminal;
- a second control circuit coupled to a first setting electrode of the driving transistor and configured to initialize the first setting electrode of the driving transistor before the light-emitting device is driven to emit light, where the first setting electrode of the driving transistor is a first electrode and/or a second electrode of the driving transistor; and
- a third control circuit coupled to the driving transistor and configured to reset the gate of the driving transistor, control the data voltage to be input into the gate of the driving transistor, and control the driving transistor to generate the operating current and drive the light-emitting device to emit light.

In some possible implementations, the first control circuit includes: a first transistor and a second transistor;

- a gate of the first transistor is coupled to the gate of the driving transistor, a first electrode of the first transistor is floated, and a second electrode of the first transistor is coupled to the leakage adjustment signal terminal; and
- a gate of the second transistor is coupled to the gate of the driving transistor, a first electrode of the second transistor is floated, and a second electrode of the second transistor is coupled to the leakage adjustment signal terminal.

In some possible implementations, the first control circuit includes: a voltage stabilizing capacitor; and

- a first electrode of the voltage stabilizing capacitor is coupled to the gate of the driving transistor, and a second electrode of the voltage stabilizing capacitor is coupled to the leakage adjustment signal terminal.

In some possible implementations, in each display frame, when the gate of the driving transistor is reset, a voltage of a signal at the leakage adjustment signal terminal is a first voltage, and when the data voltage is input to the gate of the driving transistor, the voltage of the signal at the leakage adjustment signal terminal is a second voltage; and the second voltage is not less than the first voltage.

In some possible implementations, the first voltages for different display frames are the same.

In some possible implementations, for different display frames, the second voltage is greater than a third voltage; and

- the third voltage is equal to Vda−Vth, Vda representing the data voltage, and Vth representing a threshold voltage of the driving transistor.

In some possible implementations, the second voltages for different display frames are the same; or

- the second voltages for different display frames each increase as the third voltage increases.

In some possible implementations, the second control circuit is further configured to supply, in response to a signal at a first control signal terminal, a signal at a first initialization signal terminal to the first setting electrode of the driving transistor after the data voltage is input.

In some possible implementations, the signal at the first initialization signal terminal is at a high level or a low level.

In some possible implementations, in a case where the first initialization signal terminal is at a high level, the first initialization signal terminal and the first power terminal are a single signal terminal.

In some possible implementations, the second control circuit includes a third transistor, and

- a gate of the third transistor is coupled to the first control signal terminal, a first electrode of the third transistor is coupled to the first initialization signal terminal, and a second electrode of the third transistor is coupled to the first setting electrode of the driving transistor.

In some possible implementations, the third control circuit includes:

- a data writing circuit configured to input the data voltage at a data signal terminal to the first electrode of the driving transistor in response to a signal at a second control signal terminal;
- a reset circuit configured to input a signal at a second initialization signal terminal to a second setting electrode of the driving transistor in response to a signal at a third control signal terminal; the second setting electrode of the driving transistor being a gate or a second electrode of the driving transistor;
- an initialization circuit configured to input a signal at a third initialization signal terminal to a first electrode of the light-emitting device in response to a signal at a first control signal terminal;
- a threshold compensation circuit configured to conduct the gate of the driving transistor to the second electrode of the driving transistor in response to a signal at a fourth control signal terminal; and
- a light emission control circuit configured to conduct the first electrode of the driving transistor to a first power terminal and conduct the second electrode of the driving transistor to the first electrode of the light-emitting device in response to a signal at a light emission control signal terminal, to control the operating current generated by the driving transistor to be inputted to the light-emitting device.

In some possible implementations, the data writing circuit includes a fourth transistor, a gate of the fourth transistor is coupled to the second control signal terminal, a first electrode of the fourth transistor is coupled to the data signal terminal, a second electrode of the fourth transistor is coupled to the first electrode of the driving transistor;

the reset circuit includes a fifth transistor, a gate of the fifth transistor is coupled to the third control signal terminal, a first electrode of the fifth transistor is coupled to the second initialization signal terminal, and a second electrode of the fifth transistor is coupled to the second setting electrode of the driving transistor;

the initialization circuit includes a sixth transistor, a gate of the sixth transistor is coupled to the first control signal terminal, a first electrode of the sixth transistor is coupled to the third initialization signal terminal, and a second electrode of the sixth transistor is coupled to the first electrode of the light-emitting device;

the threshold compensation circuit includes a seventh transistor and a storage capacitor, where a gate of the seventh transistor is coupled to the fourth control signal terminal, a first electrode of the seventh transistor is coupled to the gate of the driving transistor, a second electrode of the seventh transistor is coupled to the second electrode of the driving transistor, a first electrode of the storage capacitor is coupled to the first power terminal, and a second electrode of the storage capacitor is coupled to the gate of the driving transistor; and the light emission control circuit includes an eighth transistor and a ninth transistor, a gate of the eighth transistor is coupled to the light emission control signal terminal, a first electrode of the eighth transistor is coupled to the first power terminal, a second electrode of the eighth transistor is coupled to the first electrode of the driving transistor, a gate of the ninth transistor is coupled to the light emission control signal terminal, a first electrode of the ninth transistor is coupled to the second electrode of the driving transistor, and a second electrode of the ninth transistor is coupled to the first electrode of the light-emitting device.

In some possible implementations, the second control signal terminal and the fourth control signal terminal are a single signal terminal or signal terminals independent from each other.

In some possible implementations, in each display frame, an active level of the signal at the first control signal terminal is later than an active level of the signal at the second control signal terminal.

An embodiment of the present disclosure further provides a method for driving the pixel circuit described above, including a reset period, a data writing period, an initialization period and a light-emitting period, in a reset period, the third control circuit resets the gate of the driving transistor;

in a data writing period, the third control circuit controls the data voltage to be input into the gate of the driving transistor;

in an initialization period, the second control circuit initializes the first setting electrode of the driving transistor;

in a light-emitting period, the first control circuit reduces the leakage current at the gate of the driving transistor based on the signal at the leakage adjustment signal terminal; and the third control circuit controls the driving transistor to generate the operating current to drive the light-emitting device to emit light.

In some possible implementations, the method further includes: in the reset period, the reset circuit inputs, in response to a signal at a third control signal terminal, a signal at a second initialization signal terminal into a second setting electrode of the driving transistor; and in the initialization period, the initialization circuit inputs a signal at a third initialization signal terminal to the first electrode of the light-emitting device in response to a signal at a first control signal terminal.

In some possible implementations, in the data writing period, the data writing circuit inputs, in response to a signal at a second control signal terminal, the data voltage at a data signal terminal into the first electrode of the driving transistor; the threshold compensation circuit conducts, in response to the signal at the second control signal terminal, the gate of the driving transistor to the second electrode of the driving transistor; and in the light-emitting period, the light emission control circuit conducts the first electrode of the driving transistor to a first power terminal, conducts the second electrode of the driving transistor to the first electrode of the light-emitting device, and controls the operating current generated by the driving transistor to be input into the light-emitting device, in response to a signal at a light emission control signal terminal.

An embodiment of the present disclosure further provides a display panel, including:

a plurality of sub-pixels, each of the sub-pixels including a pixel circuit in any one of the above implementations;

a plurality of control signal lines, at least one of the plurality of control signal lines being coupled to the pixel circuits in a row of sub-pixels; and a driving control circuit coupled to the plurality of control signal lines.

In some possible implementations, the plurality of control signal lines include a plurality of light emission control signal lines; each row of sub-pixels correspond to one of the light emission control signal lines, and each light emission control signal line is coupled to light emission control signal terminals of the pixel circuits in a corresponding row of sub-pixels; and the driving control circuit includes: a light emission scan circuit including a plurality of light emission scan shift register units arranged in sequence; for each row of sub-pixels, the light emission control signal line coupled thereto is correspondingly coupled to one of the light emission scan shift register units.

In some possible implementations, the plurality of control signal lines include a plurality of first scan signal lines; each row of sub-pixels correspond to two first scan signal lines, a first first scan signal line of the two first scan signal lines is coupled to third control signal terminals of the pixel circuits in a corresponding row of sub-pixels, and a second first scan signal line of the two first scan signal lines is coupled to fourth control signal terminals of the pixel circuits in the corresponding row of sub-pixels; and the driving control circuit includes: a first scan control circuit including a plurality of first scan control shift register units arranged in sequence; in every two adjacent rows of sub-pixels, the first first scan control signal line coupled to a latter row of sub-pixels and the second first scan control signal line coupled to a former row of sub-pixels are correspondingly coupled to a same first scan control shift register unit.

In some possible implementations, the plurality of control signal lines further includes a plurality of second scan control signal lines and a plurality of third scan control signal lines; each row of sub-pixels corresponds to one of the second scan control signal lines and one of the third scan control signal lines, each second scan control signal line is coupled to second control signal terminals of the pixel circuits in a corresponding row of sub-pixels, and each third scan control signal line is coupled to first control signal terminals of the pixel circuits in the corresponding row of sub-pixels;

the driving control circuit includes: a second scan control circuit and a third scan control circuit;

the second scan control circuit includes a plurality of second scan control shift register units which are arranged in sequence; for each row of sub-pixels, a second scan control signal line coupled thereto is correspondingly coupled to one of the second scan control shift register units; and the third scan control circuit includes a plurality of third scan control shift register units which are arranged in sequence; for each row of sub-pixels, a third scan control signal line coupled thereto is correspondingly coupled to one of the third scan control shift register units.

In some possible implementations, the plurality of control signal lines further includes a plurality of fourth scan control signal lines and a plurality of fifth scan control signal lines; each row of sub-pixels corresponds to one of the fourth scan control signal lines and one of the fifth scan control signal lines, each fourth scan control signal line is coupled to the second control signal terminals of the pixel circuits in the corresponding row of sub-pixels, and each fifth scan control signal line is coupled to the first control signal terminal of the pixel circuits in the corresponding row of sub-pixels; and the driving control circuit includes: a fourth scan control circuit including a plurality of fourth scan control shift register units which are sequentially arranged; in every three adjacent rows of sub-pixels, a fifth scan control signal line coupled to a third row of sub-pixels and a fourth scan control signal line coupled to a first row of sub-pixels are correspondingly coupled to a same fourth scan control shift register unit.

In some possible implementations, the plurality of control signal lines further includes a plurality of sixth scan control signal lines, a plurality of seventh scan control signal lines, and a plurality of eighth scan control signal lines; each row of sub-pixels correspond to one of the sixth scan control signal lines, one of the seventh scan control signal lines and one of the eighth scan control signal lines, each sixth scan control signal line is coupled to the third control signal terminals of the pixel circuits in the corresponding row of sub-pixels, each seventh scan control signal line is coupled to the second control signal terminals of the pixel circuits in the corresponding row of sub-pixels, and each eighth scan control signal line is coupled to the first control signal terminals of the pixel circuits in the the corresponding row of sub-pixels;

the driving control circuit includes: a fifth scan control circuit and a sixth scan control circuit;

the fifth scan control circuit includes a plurality of fifth scan control shift register units which are arranged in sequence; in every two adjacent rows of sub-pixels, a sixth scan control signal line coupled to a latter row of sub-pixels and a seventh scan control signal line coupled to a former row of sub-pixels are correspondingly coupled to a same fifth scan control shift register unit; and the sixth scan control circuit includes a plurality of sixth scan control shift register units which are arranged in sequence; for each row of sub-pixels, an eighth scan control signal line coupled thereto is correspondingly coupled to one of the sixth scan control shift register units.

In some possible implementations, the plurality of control signal lines further includes a plurality of ninth scan control signal lines, a plurality of tenth scan control signal lines, and a plurality of eleventh scan control signal lines; each row of sub-pixels corresponds to one of the ninth scan control signal lines, one of the tenth scan control signal lines and one of the eleventh scan control signal lines, each ninth scan control signal line is coupled to the third control signal terminals of the pixel circuits in the corresponding row of sub-pixels, each tenth scan control signal line is coupled to the second control signal terminals of the pixel circuits in the corresponding row of sub-pixels, and each eleventh scan control signal line is coupled to the first control signal terminals of the pixel circuits in the corresponding row of sub-pixels; and the driving control circuit includes a seventh scan control circuit including a plurality of seventh scan control shift register units which are sequentially arranged; in every two adjacent rows of sub-pixels, a ninth scan control signal line coupled to a latter row of sub-pixels and a tenth scan control signal line coupled to a former row of sub-pixels are correspondingly coupled to a same seventh scan control shift register unit, and a tenth scan control signal line coupled to the latter row of sub-pixels and an eleventh scan control signal line coupled to the former row of sub-pixels are correspondingly coupled to a same seventh scan control shift register unit.

In some possible implementations, the plurality of control signal lines further includes a plurality of twelfth scan control signal lines; each row of sub-pixels correspond to one of the twelfth scan control signal lines, each twelfth scan control signal line is coupled to the fourth control signal terminals of the pixel circuits in the corresponding row of sub-pixels; and the driving control circuit includes an eighth scan control circuit including a plurality of eighth scan control shift register units which are sequentially arranged; for each row of sub-pixels, a twelfth scan control signal line coupled thereto is correspondingly coupled to one of the eighth scan control shift register units.

An embodiment of the disclosure further provides a display apparatus including the display panel described above.

DETAIL DESCRIPTION OF EMBODIMENTS

Figure 1:
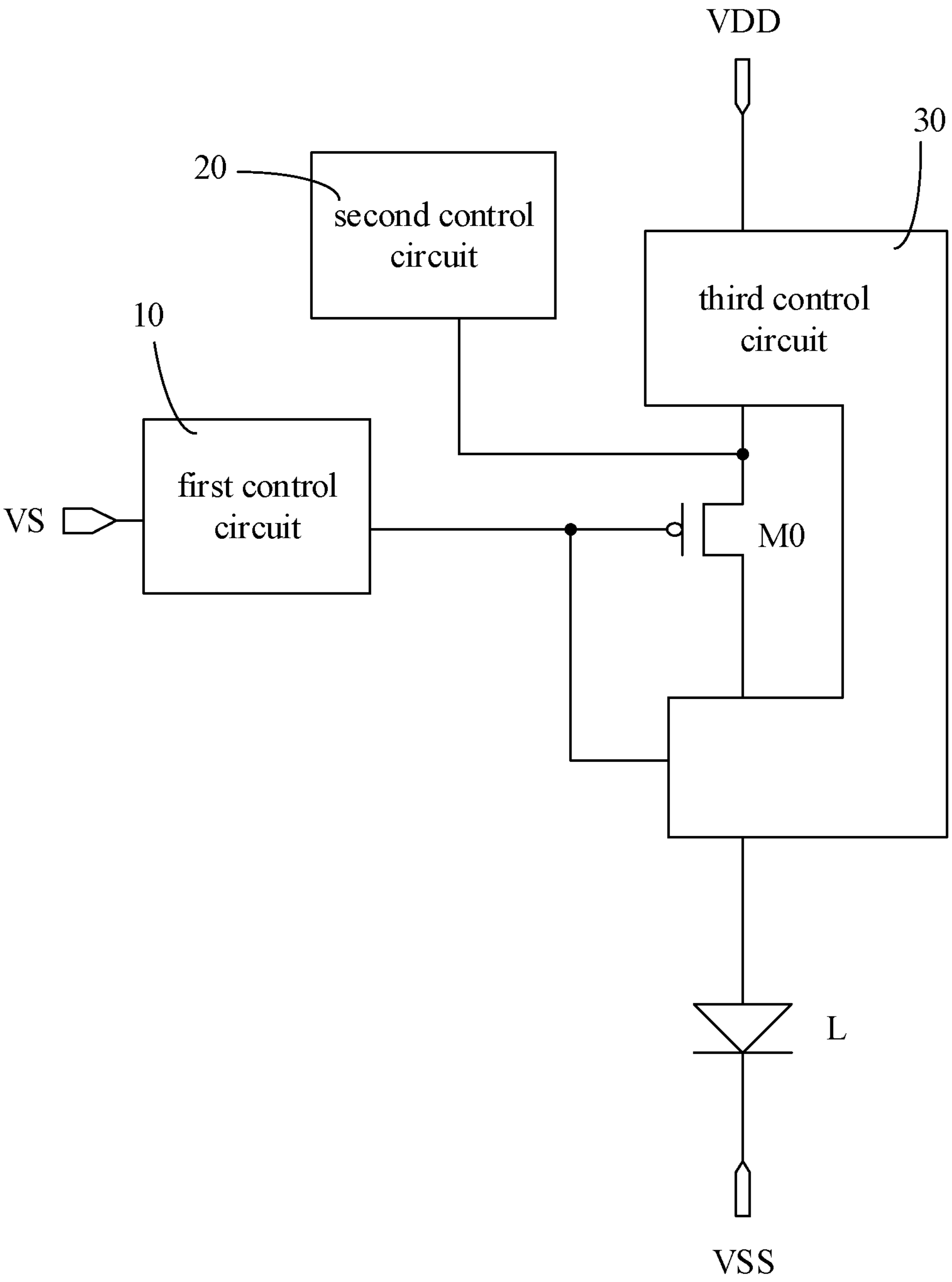
FIG. 1 is a schematic structural diagram of a pixel circuit according to an embodiment of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. The embodiments and features of the embodiments in the present disclosure may be combined with each other without conflict. All other embodiments, which can be derived by a person skilled in the art from the described embodiments of the present disclosure without creative effort, are within the protection scope of the present disclosure.

Unless defined otherwise, technical or scientific terms used herein shall have the ordinary meaning as understood by one of ordinary skill in the art to which the present disclosure belongs. The use of "first", "second" and the like in the present disclosure is not intended to indicate any order, quantity, or importance, but rather is used to distinguish one element from another. The word "comprising/including", "comprises/includes" or the like, means that the element or item preceding the word comprises/includes the element or item listed after the word and its equivalent, but does not exclude other elements or items. The word "connected/coupled", "connecting/coupling", or the like is not restricted to physical or mechanical connections, but may include electrical connections, whether direct or indirect.

It should be noted that sizes and shapes of various elements in the drawings are not to scale, but are merely intended to illustrate the present disclosure. Like reference numerals refer to like or similar elements or elements having like or similar functions throughout the description.

In some implementations of the present disclosure, a display apparatus may include a display panel. The display panel may include a base substrate. The base substrate may include a display area and a non-display area (i.e., an area of the base substrate other than the display area). The display area may include a plurality of pixel units arranged in an array. Illustratively, each pixel unit includes a plurality of sub-pixels of a same color or a plurality of sub-pixels of different colors. For example, each pixel unit may include a red sub-pixel, a green sub-pixel, and a blue sub-pixel, so that red, green, and blue may be mixed to implement color display. Alternatively, the pixel unit may include a red sub-pixel, a green sub-pixel, a blue sub-pixel, and a white sub-pixel, so that red, green, blue, and white may be mixed to implement color display. Certainly, in practical applications, the colors of light emitted by the sub-pixels in the pixel unit may be determined according to practical application environments, and is not limited herein. The following description will be made by taking a case where each pixel unit includes a red sub-pixel, a green sub-pixel, and a blue sub-pixel as an example.

In some implementations of the present disclosure, each sub-pixel may include a pixel circuit, the pixel circuit may include a driving transistor M0 and a light-emitting device L, and the driving transistor M0 controls the light-emitting device L to emit light, so that the display panel may display a picture. However, a threshold voltage Vth of the driving transistor M0 may shift due to process, aging, and the like, which may affect a driving current generated by the driving transistor and cause a Flicker problem in display with high gray scale and low gray scale.

An embodiment of the present disclosure provides a pixel circuit, as shown in FIG. 1, which may include: a light-emitting device L, a driving transistor M0, a first control circuit 10, a second control circuit 20, and a third control circuit 30. The driving transistor M0 is coupled to the light-emitting device L, the first control circuit 10 is coupled to a gate of the driving transistor M0, the second control circuit 20 is coupled to a first setting electrode of the driving transistor M0, and the third control circuit 30 is coupled to the driving transistor M0. Furthermore, the driving transistor M0 is configured to generate an operating current to drive the light-emitting device L according to a data voltage. The first control circuit 10 is configured to reduce a leakage current at the gate of the driving transistor M0 based on a signal at a leakage adjustment signal terminal VS. The second control circuit 20 is configured to initialize the first setting electrode of the driving transistor M0 before the light-emitting device L is driven to emit light. The third control circuit 30 is configured to reset the gate of the driving transistor M0, control the data voltage to be input into the gate of the driving transistor M0, and control the driving transistor M0 to generate the operating current to drive the light-emitting device L to emit light.

In the pixel circuit provided by the embodiment of the present disclosure, by providing the third control circuit 30, the data voltage can be controlled to be input into the gate of the driving transistor M0 and the driving transistor M0 can be controlled to generate the operating current to drive the light-emitting device L to emit light. By providing the first control circuit 10 coupled to the gate of the driving transistor M0, the leakage current at the gate of the driving transistor M0 can be reduced based on the signal at the leakage adjustment signal terminal VS, so that the Flicker problem during displaying with low gray scale can be alleviated. By providing the second control circuit 20, the first setting electrode of the driving transistor M0 can be initialized before the light-emitting device L is driven to emit light, so that a hysteresis effect of the driving transistor M0 can be alleviated, and the Flicker problem during displaying with high gray scale can be alleviated.

The pixel circuit provided by the embodiment of the present disclosure may be applied to display panels driven at different refresh frequencies. The pixel circuit provided by the embodiment of the present disclosure can compatibly alleviate the Flicker problem during displaying with high gray scale and displaying with low gray scale, and alleviate the Flicker problem occurring during switching of different refresh frequencies, thereby improving the display effect of the product. Furthermore, in order to reduce power consumption, the pixel circuit provided by the embodiment of the present disclosure may be applied to a situation of being driven at a lower refresh frequency (e.g., 1 Hz, 30 Hz, etc.). Moreover, in order to improve the display effect, the pixel circuit provided by the embodiment of the present disclosure may be applied to a situation of being driven at a higher refresh frequency (for example, 60 Hz, 90 Hz, 120 Hz, 240 Hz, etc.).

In some implementations of the present disclosure, as shown in FIG. 1, the first setting electrode of the driving transistor M0 may be a first electrode of the driving transistor M0. In this case, the second control circuit 20 is coupled to the first electrode of the driving transistor M0 and the second control circuit 20 is further configured to initialize the first electrode of the driving transistor M0 after the data voltage is input.

Figure 2:
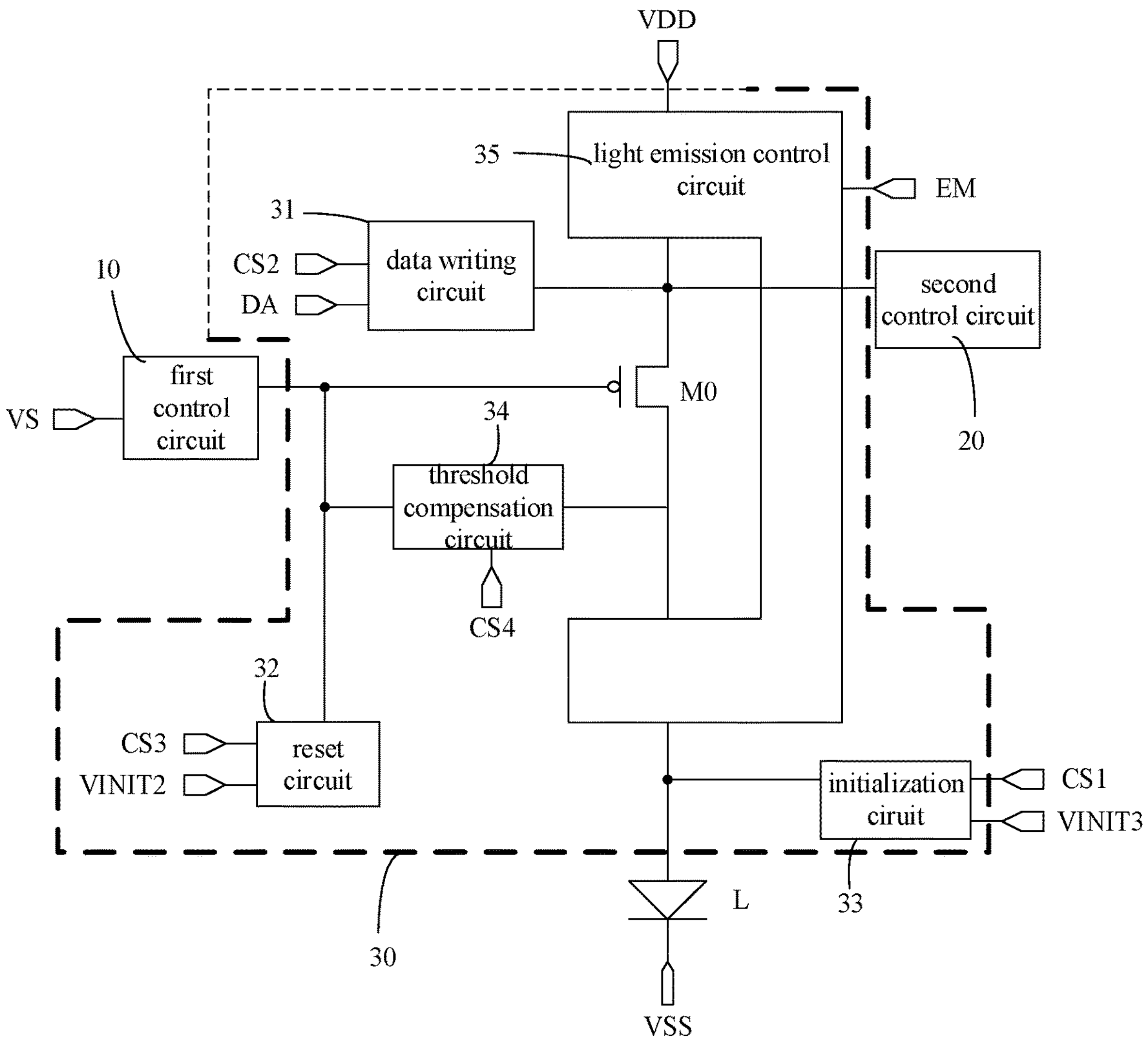
FIG. 2 is a schematic structural diagram of a pixel circuit according to an embodiment of the disclosure.

Illustratively, as shown in FIG. 2, the second control circuit 20 is further configured to provide a signal at a first initialization signal terminal VINIT1 to the first setting electrode in response to a signal at a first control signal terminal CS1. For example, the first setting electrode may be the first electrode of the driving transistor M0, and the second control circuit 20 is configured to provide, in response to the signal at the first control signal terminal CS1, the signal at the first initialization signal terminal VINIT1 to the first electrode of the driving transistor M0 after the data voltage is input.

In some implementations of the present disclosure, as shown in FIG. 2, the third control circuit 30 may include:

- a data writing circuit 31 configured to input a data voltage at a data signal terminal DA to the first electrode of the driving transistor M0 in response to a signal at a second control signal terminal CS2;
- a reset circuit 32 configured to input a signal at a second initialization signal terminal VINIT2 to a second setting electrode of the driving transistor M0 in response to a signal at a third control signal terminal CS3;
- an initialization circuit 33 configured to input a signal at a third initialization signal terminal VINIT3 to a first electrode of the light-emitting device L in response to a signal at a first control signal terminal CS1;
- a threshold compensation circuit 34 configured to conduct (i.e., electrically connect) a gate of the driving transistor M0 to a second electrode of the driving transistor M0 and stabilize a voltage difference between a first power terminal VDD and the gate of the driving transistor M0 in response to a signal at a fourth control signal terminal CS4; and
- a light emission control circuit 35 configured to conduct the first electrode of the driving transistor M0 to the first power terminal VDD and conduct the second electrode of the driving transistor M0 to the first electrode of the light-emitting device L in response to a signal at a light emission control signal terminal EM, to control an operating current generated by the driving transistor M0 to be inputted to the light-emitting device L.

Illustratively, the second setting electrode may be the gate of the driving transistor M0.

The present disclosure will be described in detail in conjunction with implementations. It should be noted that, the present embodiment is for a better explanation of the present disclosure, but does not limit the present disclosure.

Figure 3:
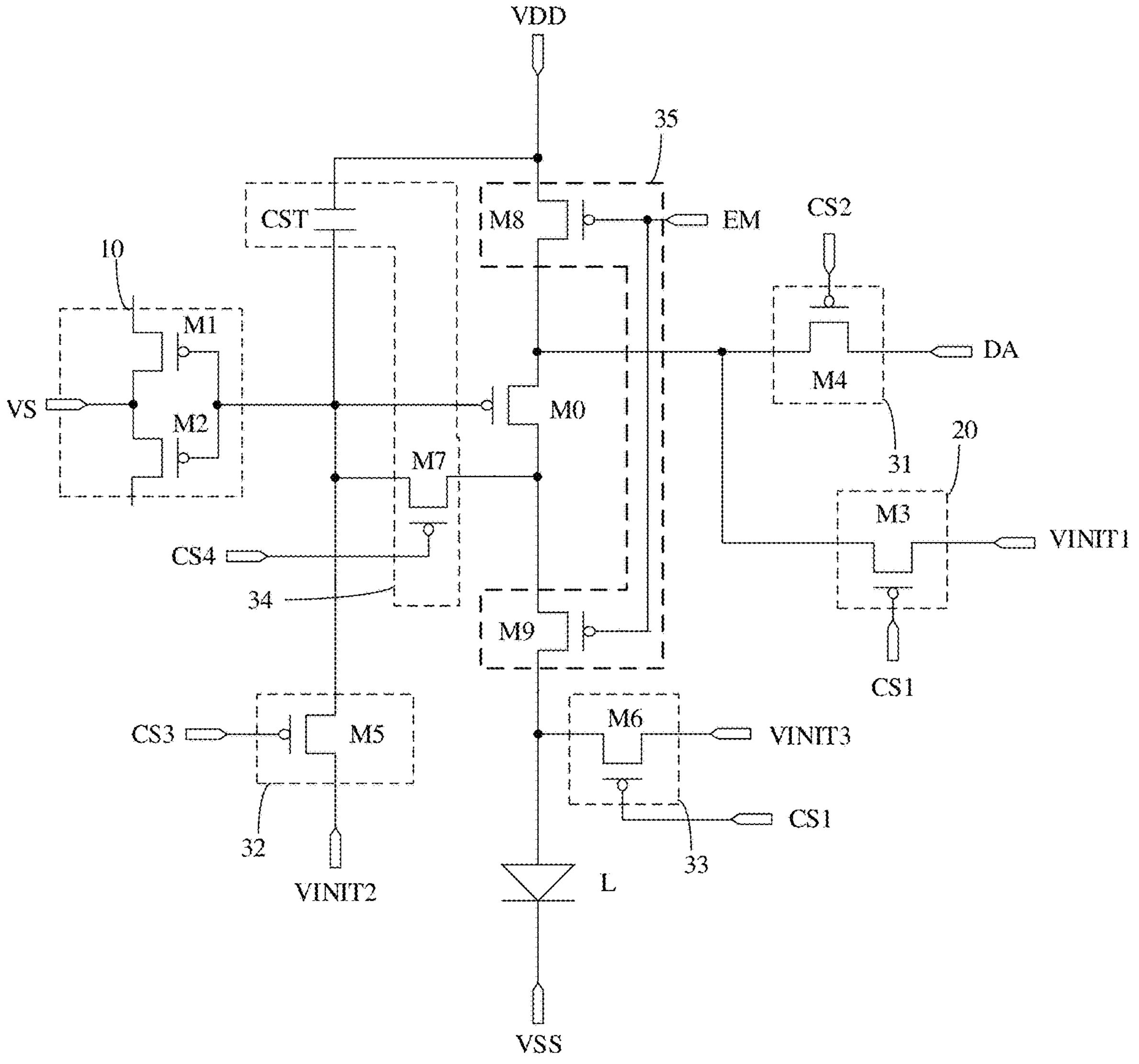
FIG. 3 is a schematic structural diagram of a pixel circuit according to an embodiment of the disclosure.

In some implementations of the present disclosure, as shown in FIG. 3, the first electrode of the light-emitting device L may be coupled to the light emission control circuit 35. A second electrode of the light-emitting device L may be coupled to a second power terminal VSS. Furthermore, the first electrode of the light-emitting device L may be an anode thereof, and the second electrode of the light-emitting device L may be a cathode thereof. Illustratively, the light-emitting device L may be a light-emitting diode. For example, the light-emitting device L may include at least one of a Micro Light-Emitting Diode (Micro LED), an Organic Light-Emitting Diode (OLED), or a Quantum Dot Light-Emitting Diode (QLED). In practical applications, a specific structure of the light-emitting device L may be designed and determined according to practical application environments, and is not limited herein.

In some implementations of the present disclosure, the first power terminal VDD may be configured to be loaded with a constant first power voltage, and the first power voltage generally has a positive voltage value. Furthermore, the second power terminal VSS may be loaded with a constant second power voltage, and the second power voltage may be generally a ground voltage or has a negative voltage value. In practical applications, specific values of the first power voltage and the second power voltage may be determined according to practical application environments, and are not limited herein.

In some implementations of the present disclosure, as shown in FIGS. 1 to 3, the driving transistor M0 may be a P-type transistor; the first electrode of the driving transistor M0 may be a source thereof, the second electrode of the driving transistor M0 may be a drain thereof, and in a case where the driving transistor M0 is in a saturation state, a current flows from the source of the driving transistor M0 to the drain of the driving transistor M0. Alternatively, the driving transistor M0 may be an N-type transistor, which is not limited herein.

In some implementations of the present disclosure, as shown in FIG. 3, the first control circuit 10 includes: a first transistor M1 and a second transistor M2. A gate of the first transistor M1 is coupled to the gate of the driving transistor M0, a first electrode of the first transistor M1 is floated, and a second electrode of the first transistor M1 is coupled to a leakage adjustment signal terminal VS. A gate of the second transistor M2 is coupled to the gate of the driving transistor M0, a first electrode of the second transistor M2 is floated, and a second electrode of the second transistor M2 is coupled to the leakage adjustment signal terminal VS. By providing the first transistor M1 and the second transistor M2, and connecting both the first transistor M1 and the second transistor M2 to the leakage adjustment signal terminal VS, the leakage current at the gate of the driving transistor M0 can be alleviated when the leakage adjustment signal terminal VS is applied with a voltage VS.

Figure 4A:
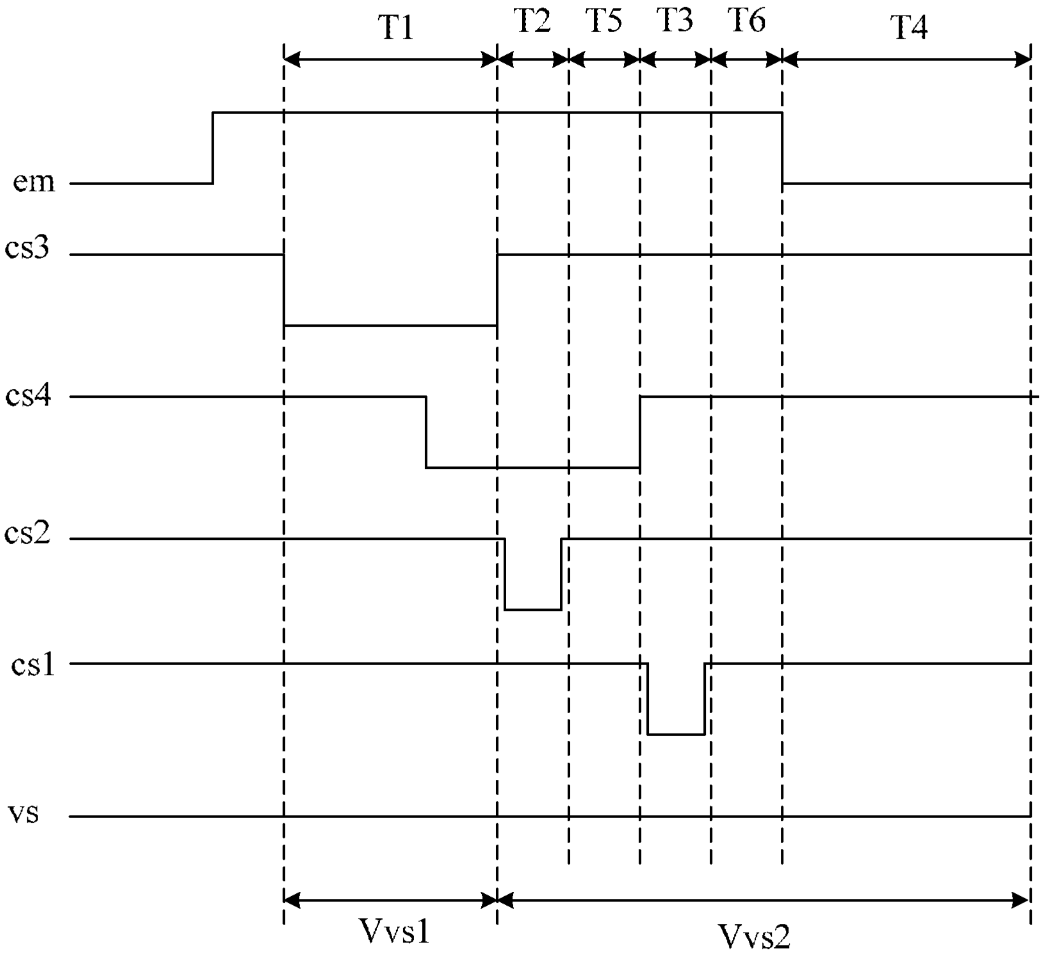
FIG. 4*a* is a timing diagram of signals for the pixel circuit according to an embodiment of the present disclosure.

In some examples, as shown in FIG. 4*a*, vs represents the signal at the leakage adjustment signal terminal VS. For example, in each display frame, when the gate of the driving transistor M0 is reset, a voltage of the signal vs at the leakage adjustment signal terminal VS is a first voltage Vvs1, and when the data voltage is input into the gate of the driving transistor M0, the voltage of the signal vs at the leakage adjustment signal terminal VS is a second voltage Vvs2. The second voltage Vvs2 may be equal to the first voltage Vvs1. In this way, the voltage of the signal vs at the leakage adjustment signal terminal VS is a fixed voltage in each display frame.

For example, first voltages Vvs1 for different display frame may be the same, so that it is unnecessary to frequently adjust the first voltage Vvs1, and the power consumption can be reduced.

For example, for different display frames, the second voltage Vvs2 may be greater than a third voltage Vvs3, the third voltage Vvs3 is equal to Vda−Vth, where Vda represents the data voltage and Vth represents the threshold voltage of the driving transistor. For example, Vda−Vth is about 0-1V, then the second voltage Vvs2 may be set to 2V. Alternatively, Vda may be a data voltage corresponding to a larger gray scale or a maximum gray scale.

For example, for different display frames, the second voltage Vvs2 may be the same, so that it is unnecessary to frequently adjust the second voltage Vvs2, and power consumption can be reduced. Therefore, for different display frames, the voltage of the signal vs at the leakage adjustment signal terminal VS may be a fixed voltage, so that it is unnecessary to frequently adjust the voltage of the signal vs at the leakage adjustment signal terminal VS, and the power consumption can be reduced.

For example, for different display frames, the second voltage Vvs2 may be increased with increase of the third voltage Vvs3, so that the second voltage Vvs2 may be adjusted with change of the third voltage Vvs3, which can further reduce the leakage current. Therefore, in different display frames, the voltage of the signal vs at the leakage adjustment signal terminal VS may be an alternating voltage, and the leakage current can be further reduced.

Figure 4B:
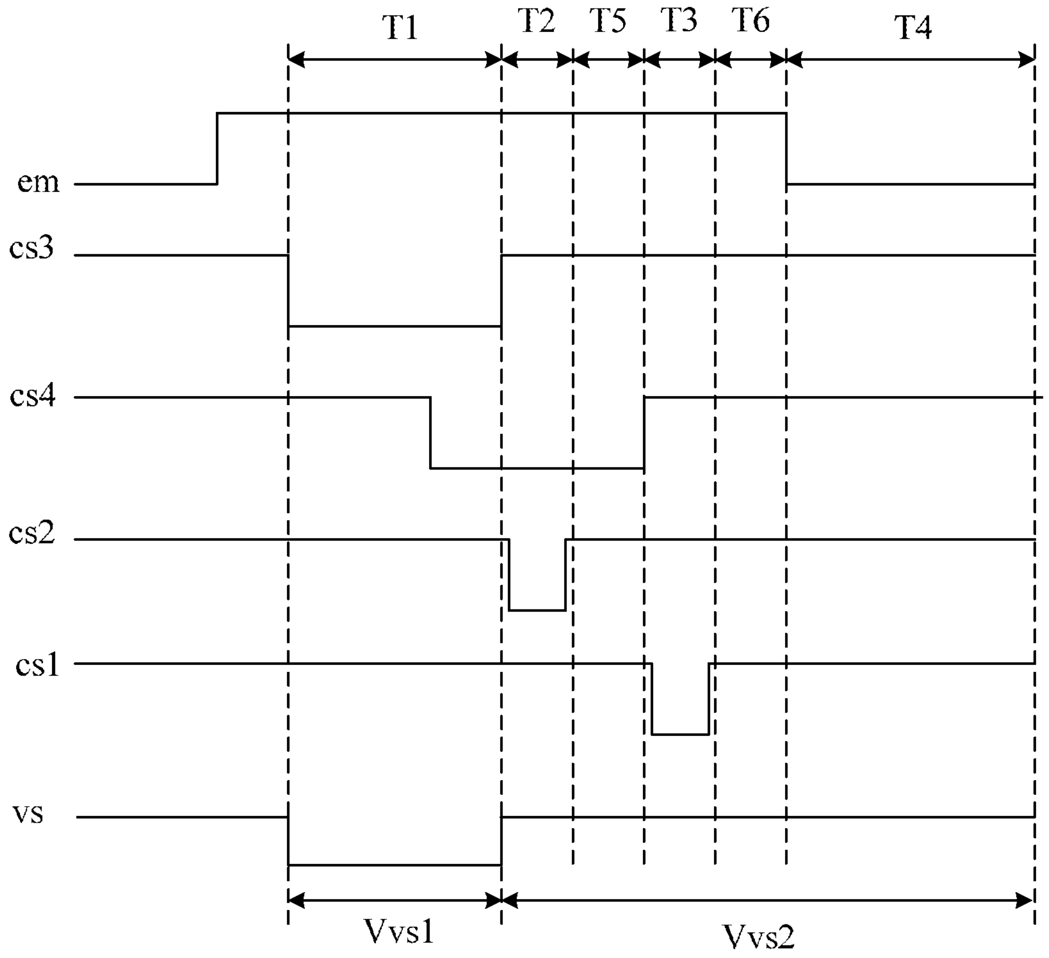
FIG. 4*b* is a timing diagram of signals for the pixel circuit according to an embodiment of the present disclosure.

In still other examples, as shown in FIG. 4*b*, vs represents a signal at the leakage adjustment signal terminal VS. For example, in each display frame, when the gate of the driving transistor M0 is reset, the voltage of the signal vs at the leakage adjustment signal terminal VS is the first voltage Vvs1, and when the data voltage is input to the gate of the driving transistor M0, the voltage of the signal vs at the leakage adjustment signal terminal VS is the second voltage Vvs2. The second voltage Vvs2 may be greater than the first voltage Vvs1. In this way, the voltage of the signal vs at the leakage adjustment signal terminal VS may be an alternating voltage in each display frame.

For example, first voltages Vvs1 of different display frames may be the same, so that it is unnecessary to frequently adjust the first voltage Vvs1, and the power consumption can be reduced.

For example, for different display frames, the second voltage Vvs2 may be greater than the third voltage Vvs3, the third voltage Vvs3 is equal to Vda−Vth, where Vda represents the data voltage and Vth represents the threshold voltage of the driving transistor. For example, Vda−Vth is about 0-1V, then the second voltage Vvs2 may be set to 2V. Alternatively, Vda may be a data voltage corresponding to a larger gray scale or a maximum gray scale.

For example, the second voltages Vvs2 for different display frames may be the same, so that it is unnecessary to frequently adjust the second voltage Vvs2, and the power consumption can be reduced.

For example, for different display frames, the second voltage Vvs2 may alternatively be increased with increase of the third voltage Vvs3, so that the second voltage Vvs2 may be adjusted with the change of third voltage Vvs3, which can further reduce the leakage current.

Illustratively, the first transistor M1 and the second transistor M2 may be P-type transistors. Alternatively, in practical applications, the first transistor and the second transistor may be N-type transistors, which is not limited herein.

In some implementations of the present disclosure, as shown in FIG. 3, the second control circuit 20 includes a third transistor M3. A gate of the third transistor M3 is coupled to the first control signal terminal CS1, a first electrode of the third transistor M3 is coupled to the first initialization signal terminal VINIT1, and a second electrode of the third transistor M3 is coupled to the first setting electrode of the driving transistor M0.

Illustratively, the third transistor M3 is turned on under the control of an active level of the first control signal at the first control signal terminal CS1 and turned off under the control of an inactive level of the first control signal. Alternatively, the third transistor M3 may be a P-type transistor, and the active level of the first control signal may be a low level and the inactive level of the first control signal may be a high level. Alternatively, the third transistor M3 may be an N-type transistor, and the active level of the first control signal may be a high level and the inactive level of the first control signal may be a low level.

In some examples, the signal at the first initialization signal terminal may be a high level signal. Thus, after the signal at the first initialization signal terminal is input to the first electrode of the driving transistor, the driving transistor may be turned on based on voltages of the gate and the first electrode of the driving transistor, so that the first electrode of the driving transistor is initialized, the second electrode of the driving transistor is also initialized, the hysteresis effect of the driving transistor M0 is further alleviated, and the Flicker problem during displaying with high gray scale can be solved.

Alternatively, the first initialization signal terminal and the first power terminal are a single signal terminal, so that the number of signal terminals can be reduced. Alternatively, the first initialization signal terminal and the first power terminal may be signal terminals independent from each other, so that the signal loaded on the first initialization signal terminal can not be affected by the first power terminal.

In other examples, the signal at the first initialization signal terminal may be a low level signal. After the signal at the first initialization signal terminal is input to the first electrode of the driving transistor, the first electrode of the driving transistor is initialized to alleviate the hysteresis effect of the driving transistor M0, so that the Flicker problem during displaying with high gray scale can be solved.

Alternatively, the first initialization signal terminal and the second power terminal are a single signal terminal, so that the number of signal terminals can be reduced. Alternatively, the first initialization signal terminal and the second power terminal may be signal terminals independent from each other, so that the signal loaded on the first initialization signal terminal can not be affected by the second power terminal.

In some implementations of the present disclosure, as shown in FIG. 3, the data writing circuit 31 includes a fourth transistor M4, a gate of the fourth transistor M4 is coupled to the second control signal terminal CS2, a first electrode of the fourth transistor M4 is coupled to the data signal terminal DA, and a second electrode of the fourth transistor M4 is coupled to the first electrode of the driving transistor M0.

Illustratively, the fourth transistor M4 is turned on under the control of an active level of a second control signal at the second control signal terminal CS2 and turned off under the control of an inactive level of the second control signal. Alternatively, the fourth transistor M4 may be a P-type transistor, and the active level of the second control signal may be a low level, and the inactive level of the second control signal may be a high level. Alternatively, the fourth transistor M4 may be an N-type transistor, and the active level of the second control signal may be a high level, and the inactive level of the second control signal may be a low level.

In some implementations of the present disclosure, as shown in FIG. 3, the reset circuit 32 includes a fifth transistor M5, a gate of the fifth transistor M5 is coupled to the third control signal terminal CS3, a first electrode of the fifth transistor M5 is coupled to the second initialization signal terminal VINIT2, and a second electrode of the fifth transistor M5 is coupled to the second setting electrode of the driving transistor M0.

Illustratively, the fifth transistor M5 is turned on under the control of an active level of a third control signal at the third control signal terminal CS3 and turned off under the control of an inactive level of the third control signal. Alternatively, the fifth transistor M5 may be a P-type transistor, and the active level of the third control signal may be a low level and the inactive level of the third control signal may be a high level. Alternatively, the fifth transistor M5 may be an N-type transistor, and the active level of the third control signal may be a high level and the inactive level of the third control signal may be a low level.

In some implementations of the present disclosure, as shown in FIG. 3, the initialization circuit 33 includes a sixth transistor M6, a gate of the sixth transistor M6 is coupled to the first control signal terminal CS1, a first electrode of the sixth transistor M6 is coupled to the third initialization signal terminal VINIT3, and a second electrode of the sixth transistor M6 is coupled to the first electrode of the light-emitting device L.

Illustratively, the sixth transistor M6 is turned on under the control of an active level of a first control signal at the first control signal terminal CS1 and turned off under the control of an inactive level of the first control signal. Alternatively, the sixth transistor M6 may be a P-type transistor, and the active level of the first control signal may be a low level, and the inactive level of the first control signal may be a high level. Alternatively, the sixth transistor M6 may be an N-type transistor, and the active level of the first control signal may be a high level, and the inactive level of the first control signal may be a low level.

In some implementations of the present disclosure, as shown in FIG. 3, the threshold compensation circuit 34 includes a seventh transistor M7 and a storage capacitor CST, a gate of the seventh transistor M7 is coupled to the fourth control signal terminal CS4, a first electrode of the seventh transistor M7 is coupled to the gate of the driving transistor M0, a second electrode of the seventh transistor M7 is coupled to the second electrode of the driving transistor M0, a first electrode of the storage capacitor CST is coupled to the first power terminal VDD, and a second electrode of the storage capacitor CST is coupled to the gate of the driving transistor M0.

Illustratively, the seventh transistor M7 is turned on under the control of an active level of a fourth control signal at the fourth control signal terminal CS4 and turned off under the control of an inactive level of the fourth control signal. Alternatively, the seventh transistor M7 may be a P-type transistor, and the active level of the fourth control signal may be a low level and the inactive level of the fourth control signal may be a high level. Alternatively, the seventh transistor M7 may be an N-type transistor, and the active level of the fourth control signal may be a high level and the inactive level of the fourth control signal may be a low level.

In some implementations of the present disclosure, as shown in FIG. 3, the light emission control circuit 35 includes an eighth transistor M8 and a ninth transistor M9, a gate of the eighth transistor M8 is coupled to the light emission control signal terminal EM, a first electrode of the eighth transistor M8 is coupled to the first power terminal VDD, a second electrode of the eighth transistor M8 is coupled to the first electrode of the driving transistor M0, a gate of the ninth transistor M9 is coupled to the light emission control signal terminal EM, a first electrode of the ninth transistor M9 is coupled to the second electrode of the driving transistor M0, and a second electrode of the ninth transistor M9 is coupled to the first electrode of the light-emitting device L.

Illustratively, the eighth transistor M8 is turned on under the control of an active level of a light emission control signal at the light emission control signal terminal EM and turned off under the control of an inactive level of the light emission control signal. Alternatively, the eighth transistor M8 may be a P-type transistor, and the active level of the light emission control signal may be a low level and the inactive level of the light emission control signal may be a high level. Alternatively, the eighth transistor M8 may be an N-type transistor, and the active level of the light emission control signal may be a high level and the inactive level of the light emission control signal may be a low level.

Illustratively, the ninth transistor M9 is turned on under the control of an active level of the light emission control signal at the light emission control signal terminal EM and turned off under the control of an inactive level of the light emission control signal. Alternatively, the ninth transistor M9 may be a P-type transistor, and the active level of the light emission control signal may be a low level and the inactive level of the light emission control signal may be a high level. Alternatively, the ninth transistor M9 may be an N-type transistor, and the active level of the light emission control signal may be a high level and the inactive level of the light emission control signal may be a low level.

Illustratively, the second initialization signal terminal VINIT2 and the third initialization signal terminal VINIT3 may be a single signal terminal. Alternatively, the second initialization signal terminal VINIT2 and the third initialization signal terminal VINIT3 may be signal terminals independent from each other, so that the second initialization signal terminal VINIT2 and the third initialization signal terminal VINIT3 may be applied with the same or different voltages.

Illustratively, the second initialization signal terminal VINIT2 and the first initialization signal terminal VINIT1 may a single signal terminal. Alternatively, the second initialization signal terminal VINIT2 and the first initialization signal terminal VINIT1 may be signal terminals independent from each other, so that the second initialization signal terminal VINIT2 and the first initialization signal terminal VINIT1 may be applied with the same or different voltages.

For example, the second control signal terminal CS2 and the fourth control signal terminal CS4 may be signal terminals independent from each other, and the second control signal terminal CS2 and the fourth control signal terminal CS 4 may be loaded with different signals.

In a specific implementation, the first electrode of each transistor may be used as a source thereof, and a second electrode of each transistor may be used as a drain thereof according to the type of the transistor and a signal at the gate of the transistor; alternatively, the first electrode of the transistor may be used as the drain thereof, and the second electrode of the transistor may be used as the source thereof, which may be determined according to actual application environments, which are not specifically distinguished herein.

The above description is merely an example of a specific structure of each circuit in the pixel circuit provided in the embodiment of the present disclosure, and in specific implementations, the specific structure of each circuit is not limited to the structure provided in the embodiment of the present disclosure, and may be another structure known to those skilled in the art, which is within the protection scope of the present disclosure, and is not limited herein.

The following description will be given taking a case where each transistor is a P-type transistor. Illustratively, a timing diagram of signals corresponding to the pixel circuit shown in FIG. 3 is shown in FIG. 4*a*. In each display frame, the active level of the signal at the first control signal terminal CS1 is later than the active level of the signal at the second control signal terminal CS2. In this way, in each display frame, a timing that the third transistor M3 is turned on may be later than a timing that the fourth transistor M4 is turned on. In other words, the timing that the fourth transistor M4 is turned on may be earlier than the timing that the third transistor M3 is turned on.

Figure 5:
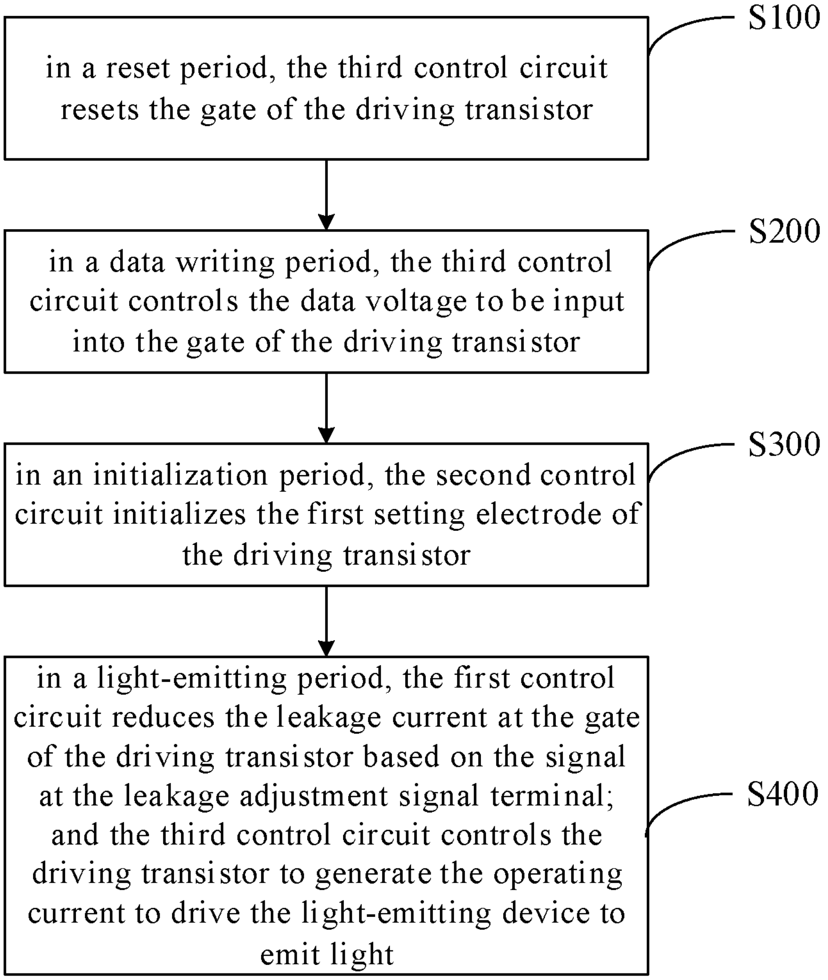
FIG. 5 is a flowchart of a method for driving a pixel circuit according to an embodiment of the present disclosure.

As shown in FIG. 5, a method for driving the pixel circuit provided by the embodiment of the present disclosure may include the following steps:

S100, in a reset period, the third control circuit resets the gate of the driving transistor;

S200, in a data writing period, the third control circuit controls the data voltage to be input into the gate of a driving transistor;

S300, in an initialization period, the second control circuit initializes the first setting electrode of the driving transistor; and S400, in a light-emitting period, the first control circuit reduces the leakage current at the gate of the driving transistor based on the signal at the leakage adjustment signal terminal; and the third control circuit controls the driving transistor to generate the operating current to drive the light-emitting device to emit light.

Illustratively, the method further includes: in the reset period, the reset circuit 32 inputs the signal at the second initialization signal terminal VINIT2 to the second setting electrode of the driving transistor M0 in response to the signal at the third control signal terminal CS3. Illustratively, the second setting electrode of the driving transistor M0 is the gate of the drive transistor M0.

In some implementations, the method further includes: in the reset period, the threshold compensation circuit 34 conducts the gate of the driving transistor M0 to the second electrode thereof in response to the signal at the fourth control signal terminal CS4.

Illustratively, the method further includes: in the initialization period, the initialization circuit 33 inputs the signal at the third initialization signal terminal VINIT3 to the first electrode of the light-emitting device L in response to the signal at the first control signal terminal CS1.

Illustratively, the method further includes: in the data writing period, the data writing circuit 31 inputs the data voltage at the data signal terminal DA to the first electrode of the driving transistor M0 in response to the signal at the second control signal terminal CS2; the threshold compensation circuit 34 conducts the gate of the driving transistor M0 to the second electrode of the driving transistor M0 in response to the signal at the fourth control signal terminal CS4.

Illustratively, the method further includes: in the light-emitting period, the light-emission control circuit 35 conducts the first electrode of the driving transistor M0 to the first power terminal VDD and conducts the second electrode of the driving transistor M0 to the first electrode of the light-emitting device L in response to the signal at the light-emission control signal terminal EM, to control the operating current generated by the driving transistor M0 to be input into the light-emitting device L.

In some examples, an operation process of the pixel circuit provided by the embodiment of the present disclosure in a display frame is described below with reference to the timing diagrams of the signals shown in FIG. 4*a* and FIG. 4*b* by taking the structure of the pixel circuit shown in FIG. 3 as an example. The reset period T1, the data writing period T2, the initialization period T3, and the light-emitting period T4 in the timing diagram of signals shown in FIG. 4*a* are mainly selected to describe, where em represents a light emission control signal loaded on the light emission control signal terminal EM, vc1 represents a first control signal at the first control signal terminal CS1, vc2 represents a second control signal at the second control signal terminal CS2, vc3 represents a third control signal at the third control signal terminal CS3, and vc4 represents a fourth control signal at the fourth control signal terminal CS4.

In the reset period T1, first, the fifth transistor M5 is turned on under the control of a low level of the third control signal cs3, the third transistor M3 and the sixth transistor M6 are turned off under the control of a high level of the first control signal cs1, the fourth transistor M4 is turned off under the control of a high level of the second control signal cs2, the seventh transistor M7 is turned off under the control of a high level of the fourth control signal cs4, and the eighth transistor M8 and the ninth transistor M9 are turned off under the control of a high level of the light emission control signal em. The turned-on fifth transistor M5 provides the signal at the second initialization signal terminal VINIT2 to the gate of the driving transistor M0 to reset the gate of the driving transistor M0.

Thereafter, the fifth transistor M5 is turned on under the control of a low level of the third control signal cs3, the third transistor M3 and the sixth transistor M6 are turned off under the control of a high level of the first control signal cs1, the fourth transistor M4 is turned off under the control of a high level of the second control signal cs2, the seventh transistor M7 is turned on under the control of a low level of the fourth control signal cs4, and the eighth transistor M8 and the ninth transistor M9 are turned off under the control of a high level of the light emission control signal em. The turned-on fifth transistor M5 provides the signal at the second initialization signal terminal VINIT2 to the gate of the driving transistor M0 to initialize the gate of the driving transistor M0. The turned-on fifth transistor M5 provides the signal at the second initialization signal terminal VINIT2 to the gate of the driving transistor M0 to reset the gate of the driving transistor M0. The turned-on seventh transistor M7 conducts the gate of the driving transistor M0 to the second electrode of the driving transistor M0, and further supplies the signal at the second initialization signal terminal VINIT2 to the second electrode of the driving transistor M0 to reset the second electrode of the driving transistor M0.

In the data writing period T2, the fifth transistor M5 is turned off under the control of a high level of the third control signal cs3, the third transistor M3 and the sixth transistor M6 are turned off under the control of a high level of the first control signal cs1, the fourth transistor M4 is turned on under the control of a low level of the second control signal cs2, the seventh transistor M7 is turned on under the control of a low level of the fourth control signal cs4, and the eighth transistor M8 and the ninth transistor M9 are turned off under the control of a high level of the light emission control signal em. The turned-on fourth transistor M4 inputs the data voltage Vda at the data signal terminal DA to the first electrode of the driving transistor M0. The turned-on seventh transistor M7 conducts the gate of the driving transistor M0 to the second electrode of the driving transistor M0, so that the driving transistor M0 serves as a diode, and the gate of the driving transistor M0 may be charged with the data voltage Vda, and a voltage at the gate of the driving transistor M0 becomes Vda−Vth, where Vth represents a threshold voltage of the driving transistor M0.

In the initialization period T3, the fifth transistor M5 is turned off under the control of a high level of the third control signal cs3, the third transistor M3 and the sixth transistor M6 are turned on under the control of a low level of the first control signal cs1, the fourth transistor M4 is turned off under the control of a high level of the second control signal cs2, the seventh transistor M7 is turned off under the control of a high level of the fourth control signal cs4, and the eighth transistor M8 and the ninth transistor M9 are turned off under the control of a high level of the light emission control signal em. The turned-on third transistor M3 supplies the signal at the first initialization signal terminal VINIT1 to the first electrode of the driving transistor M0 to initialize the first electrode of the driving transistor M0. The turned-on sixth transistor M6 supplies the signal at the third initialization signal terminal VINIT3 to the first electrode of the light-emitting device L to initialize the first electrode of the light-emitting device L.

In the light-emitting period T4, the fifth transistor M5 is turned off under the control of a high level of the third control signal cs3, the third transistor M3 and the sixth transistor M6 are turned off under the control of a high level of the first control signal cs1, the fourth transistor M4 is turned off under the control of a high level of the second control signal cs2, the seventh transistor M7 is turned off under the control of a high level of the fourth control signal cs4, and the eighth transistor M8 and the ninth transistor M9 are turned on under the control of a low level of the light emission control signal em. The turned-on eighth transistor M8 conducts the first power terminal VDD to the first electrode of the driving transistor M0, so that a voltage of the first electrode of the driving transistor M0 is equal to the first power voltage Vdd. A voltage at the gate of the driving transistor M0 is equal to Vda−Vth, and the operating current generated by the driving transistor M0 for driving the light-emitting device L to emit light is:

Ids, which is equal to: $K[Vdd-(Vda-Vth)-Vth]^2=K[Vdd-Vda]^2$, that is, $Ids=K[Vdd-(Vda-Vth)-Vth]^2-K[Vdd-Vda]^2$.

Therefore, the operating current for driving the light-emitting device L to emit light is independent of the threshold voltage Vth of the driving transistor M0. Further, the leakage current at the gate of the driving transistor M0 is reduced due to the action of the signal at the leakage adjustment signal terminal VS, and the voltage at the gate of the driving transistor M0 can be further kept stable.

In summary, with the first transistor M1 and the second transistor M2, the leakage current at the gate of the driving transistor M0 can be reduced based on the signal at the leakage adjustment signal terminal VS, so that the Flicker problem during displaying with a low gray scale can be alleviated. Furthermore, with the third transistor M3, the first electrode of the driving transistor M0 can be initialized after the data voltage is input and before the light-emitting device L is driven to emit light, so that the hysteresis effect of the driving transistor M0 can be alleviated, and the Flicker problem during displaying with a high gray scale can be alleviated. Therefore, the pixel circuit provided by the embodiment of the present disclosure can simultaneously solve the Flicker problem during displaying with high gray scale and the Flicker problem during displaying with low gray scale.

In addition, in the pixel circuit provided by the embodiment of the present disclosure, a buffering period T5 may be arranged between the data writing period T2 and the initialization period T3, and a buffering period T6 may be arranged between the initialization period T3 and the light-emitting stage T4, and by arranging the buffering periods T5 and T6, the signals in the pixel circuit may be stabilized and then enter the next period, so that the stability of the pixel circuit is further improved.

Figure 6:
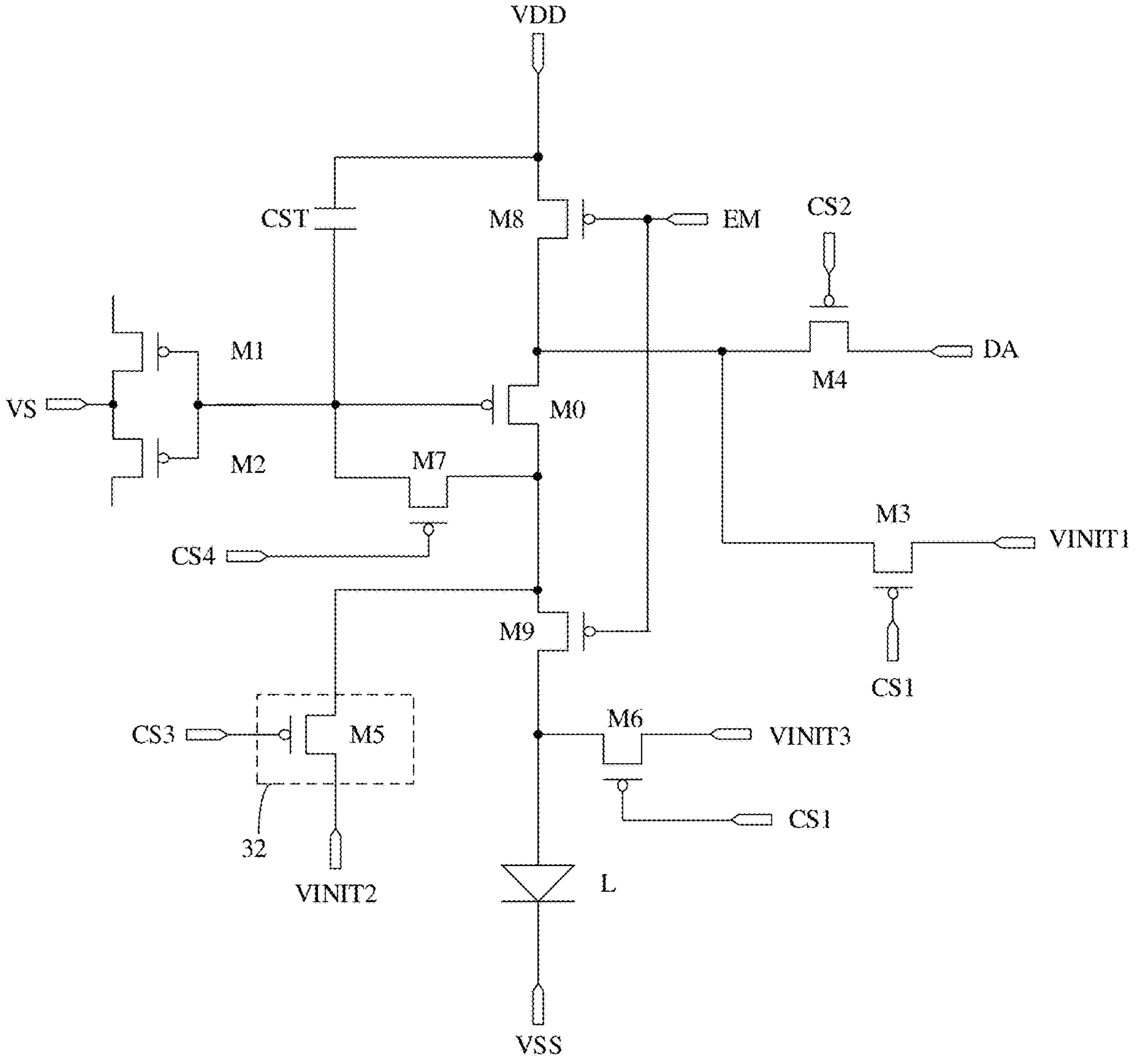
FIG. 6 is a schematic structural diagram of a pixel circuit according to an embodiment of the present disclosure.

An embodiment of the present disclosure provides another schematic structural diagram of a pixel circuit, as shown in FIG. 6, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, as shown in FIG. 6, the second setting electrode may be the second electrode of the driving transistor M0. Then, the reset circuit 32 is configured to input the signal at the second initialization signal terminal VINIT2 to the second electrode of the driving transistor M0 in response to the signal at the third control signal terminal CS3. Furthermore, the second electrode of the fifth transistor M5 is coupled to the second electrode of the driving transistor M0.

In some implementations of the present disclosure, the first control signal terminal CS1, the second control signal terminal CS2, the third control signal terminal CS3 and the fourth control signal terminal CS4 are signal terminals independent from each other, so as to be loaded with different signals, respectively.

In some implementations of the present disclosure, as shown in FIG. 6, the first setting electrode may be the first electrode of the driving transistor M0. Then the second control circuit 20 is coupled to the first electrode of the driving transistor M0, and the second control circuit 20 is further configured to initialize the first electrode of the driving transistor M0 after the data voltage is input.

In some examples, the timing diagram of signals corresponding to the pixel circuit shown in FIG. 6 may be as shown in FIGS. 4*a* and 4*b*. The driving process of the pixel circuit provided by the embodiment of the present disclosure may be as follows.

In the reset period T1, first, the fifth transistor M5 is turned on under the control of a low level of the third control signal cs3, the third transistor M3 and the sixth transistor M6 are turned off under the control of a high level of the first control signal cs1, the fourth transistor M4 is turned off under the control of a high level of the second control signal cs2, the seventh transistor M7 is turned off under the control of a high level of the fourth control signal cs4, and the eighth transistor M8 and the ninth transistor M9 are turned off under the control of a high level of the light emission control signal em. The turned-on fifth transistor M5 supplies the signal at the second initialization signal terminal VINIT2 to the second electrode of the driving transistor M0 to reset the second electrode of the driving transistor M0.

Thereafter, the fifth transistor M5 is turned on under the control of the low level of a third control signal cs3, the third transistor M3 and the sixth transistor M6 are turned off under the control of a high level of the first control signal cs1, the fourth transistor M4 is turned off under the control of a high level of the second control signal cs2, the seventh transistor M7 is turned on under the control of a low level of the fourth control signal cs4, and the eighth transistor M8 and the ninth transistor M9 are turned off under the control of a high level of the light emission control signal em. The turned-on fifth transistor M5 supplies the signal at the second initialization signal terminal VINIT2 to the gate of the driving transistor M0 to initialize the gate of the driving transistor M0. The turned-on fifth transistor M5 supplies the signal at the second initialization signal terminal VINIT2 to the second electrode of the driving transistor M0 to reset the second electrode of the driving transistor M0. The turned-on seventh transistor M7 conducts the gate of the driving transistor M0 to the second electrode of the driving transistor M0, and further supplies the signal at the second initialization signal terminal VINIT2 to the gate of the driving transistor M0 to reset the gate of the driving transistor M0.

The operation processes of the pixel circuit in the data writing period T2, the initialization period T3 and the light-emitting period T4 may refer to the above description, and are not described herein again.

Figure 7:
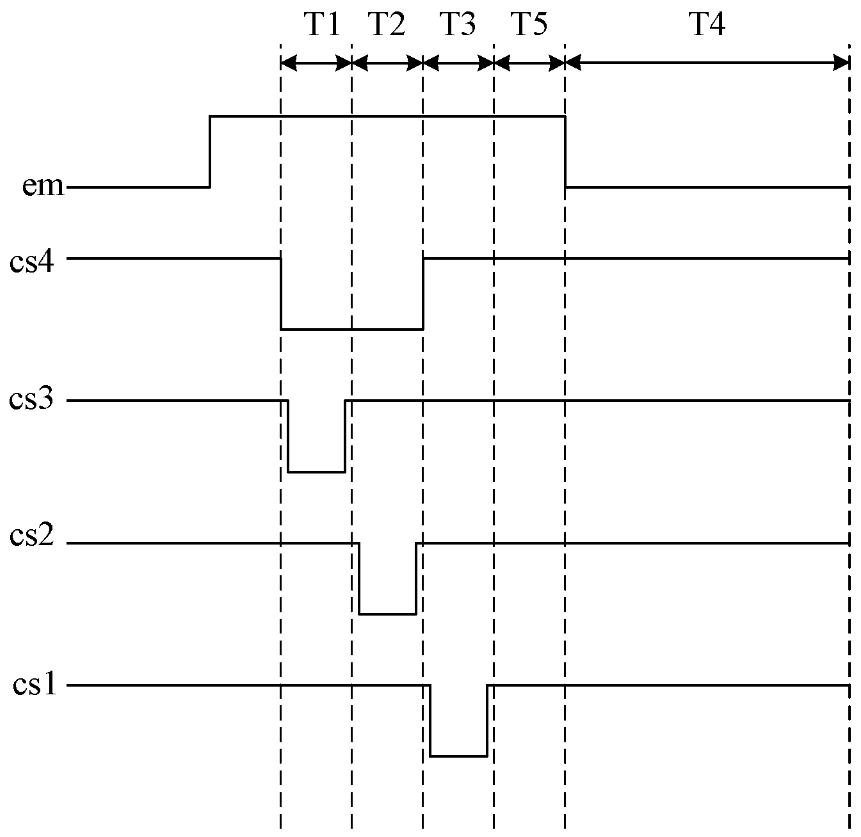
FIG. 7 is a timing diagram of signals for the pixel circuit according to an embodiment of the present disclosure.

In other examples, the timing diagram of signals corresponding to the pixel circuit shown in FIG. 6 may alternatively be as shown in FIG. 7. The following describes an operation process of the pixel circuit provided by the embodiment of the present disclosure in a display frame by taking the structure of the pixel circuit shown in FIG. 6 as an example in conjunction with the timing diagram of signals shown in FIG. 7. The reset period T1, the data writing period T2, the initialization period T3, and the light-emitting period T4 in the timing diagram of signals shown in FIG. 7 are mainly selected to describe, where em represents a light emission control signal loaded on the light emission control signal terminal EM, vc1 represents a first control signal at the first control signal terminal CS1, vc2 represents a second control signal at the second control signal terminal CS2, vc3 represents a third control signal at the third control signal terminal CS3, and vc4 represents a fourth control signal at the fourth control signal terminal CS4.

In the reset period T1, first, the fifth transistor M5 is turned on under the control of a low level of the third control signal cs3, the third transistor M3 and the sixth transistor M6 are turned off under the control of a high level of the first control signal cs1, the fourth transistor M4 is turned off under the control of a high level of the second control signal cs2, the seventh transistor M7 is turned on under the control of a low level of the fourth control signal cs4, and the eighth transistor M8 and the ninth transistor M9 are turned off under the control of a high level of the light emission control signal. The turned-on fifth transistor M5 supplies the signal at the second initialization signal terminal VINIT2 to the second electrode of the driving transistor M0 to reset the second electrode of the driving transistor M0. The turned-on seventh transistor M7 conducts the gate of the driving transistor M0 to the second electrode of the driving transistor M0 to reset the gate of the driving transistor M0.

In the data writing period T2, the fifth transistor M5 is turned off under the control of a high level of the third control signal cs3, the third transistor M3 and the sixth transistor M6 are turned off under the control of a high level of the first control signal cs1, the fourth transistor M4 is turned on under the control of a low level of the second control signal cs2, the seventh transistor M7 is turned on under the control of a low level of the fourth control signal cs4, and the eighth transistor M8 and the ninth transistor M9 are turned off under the control of a high level of the light emission control signal. The turned-on fourth transistor M4 inputs the data voltage Vda at the data signal terminal DA to the first electrode of the driving transistor M0. The turned-on seventh transistor M7 conducts the gate of the driving transistor M0 to the second electrode of the driving transistor M0, so that the driving transistor M0 serves as a diode, and the gate of the driving transistor M0 can be charged with the data voltage Vda, and a voltage at the gate of the driving transistor M0 becomes Vda−Vth, where Vth represents a threshold voltage of the driving transistor M0.

The operation process in the initialization period T3 may refer to the above description, and will not be described herein.

The operation process in the light-emitting period T4 may refer to the above description, and will not be described herein.

Figure 8:
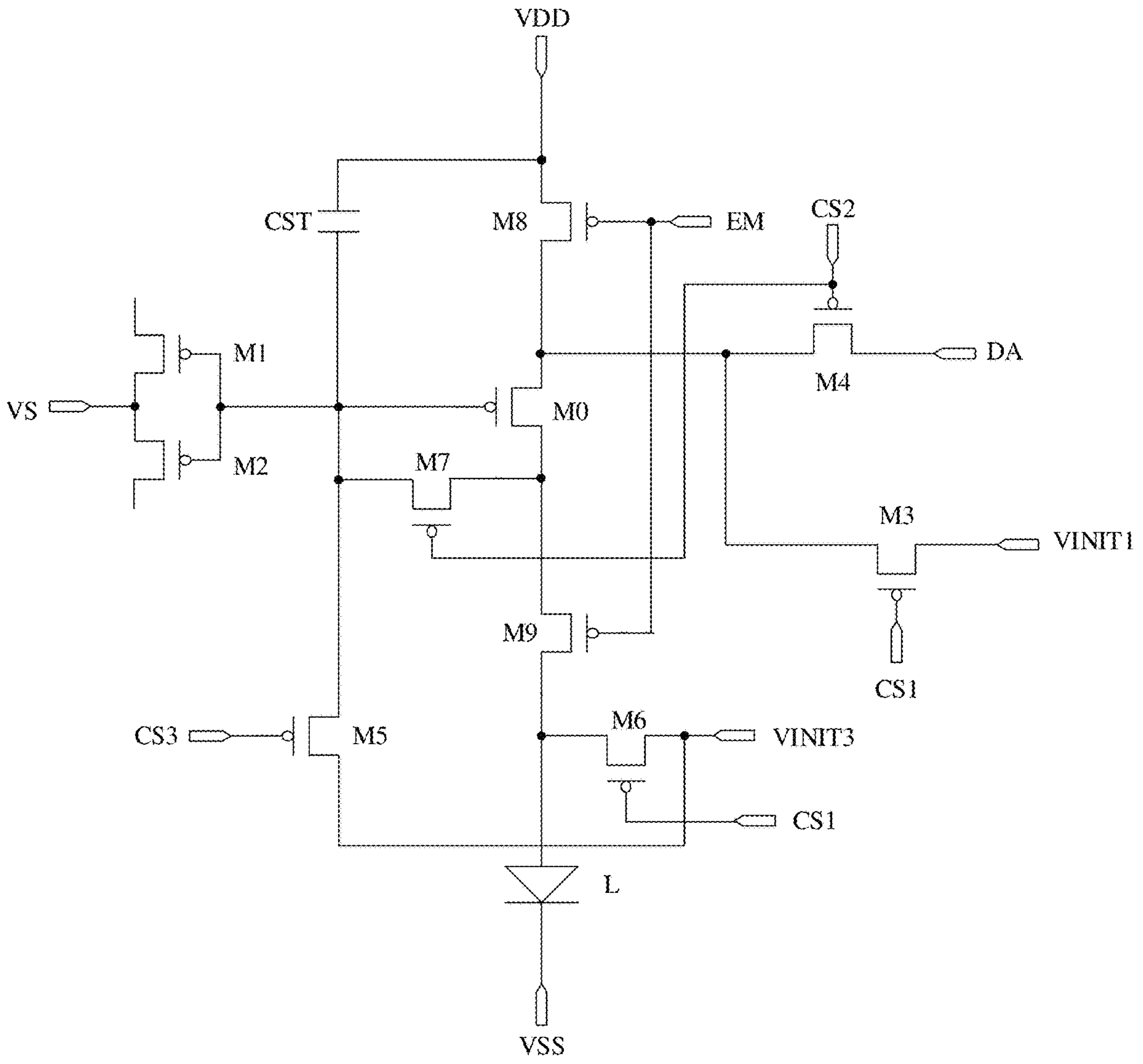
FIG. 8 is a schematic structural diagram of a pixel circuit according to an embodiment of the present disclosure.

An embodiment of the present disclosure provides still another schematic structural diagram of a pixel circuit, as shown in FIG. 8, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, the second control signal terminal CS2 and the fourth control signal terminal CS4 are a single signal terminal, so that the number of signal terminals is reduced and the number of wires is reduced. Illustratively, as shown in FIG. 8, the gate of the fourth transistor M4 and the gate of the seventh transistor M7 are both coupled to the second control signal terminal CS2.

In some implementations of the present disclosure, the second initialization signal terminal VINIT2 and the third initialization signal terminal VINIT3 are a single signal terminal, so that the number of signal terminals is reduced and the number of wires is reduced. Illustratively, as shown in FIG. 8, the first electrode of the fifth transistor M5 and the first electrode of the sixth transistor M6 are both coupled to the third initialization signal terminal VINIT3.

In some implementations of the present disclosure, as shown in FIG. 8, the first setting electrode may be the first electrode of the driving transistor M0. The second control circuit 20 is coupled to the first electrode of the driving transistor M0 and the second control circuit 20 is further configured to initialize the first electrode of the driving transistor M0 after the data voltage is input.

Figure 9:
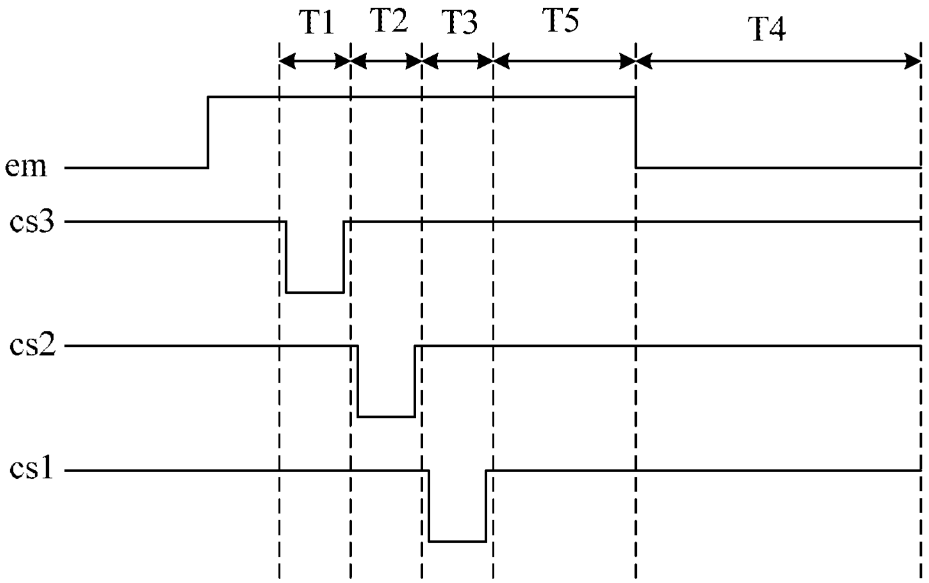
FIG. 9 is a timing diagram of signals for the pixel circuit according to an embodiment of the present disclosure.

FIG. 9 shows a timing diagram of signals corresponding to the pixel circuit shown in FIG. 8. The following describes an operation process of the pixel circuit provided by the embodiment of the present disclosure in a display frame by taking the structure of the pixel circuit shown in FIG. 8 as an example in conjunction with the timing diagram of signals shown in FIG. 9. The reset period T1, the data writing period T2, the initialization period T3, and the light-emitting period T4 in the timing diagram of signals shown in FIG. 9 are mainly selected to describe, where em represents a light emission control signal loaded on the light emission control signal terminal EM, vc1 represents a first control signal at the first control signal terminal CS1, vc2 represents a second control signal at the second control signal terminal CS2, and vc3 represents a third control signal at the third control signal terminal CS3.

In the reset period T1, the fifth transistor M5 is turned on under the control of a low level of the third control signal cs3, the third transistor M3 and the sixth transistor M6 are turned off under the control of a high level of the first control signal cs1, the fourth transistor M4 and the seventh transistor M7 are turned off under the control of a high level of the second control signal cs2, and the eighth transistor M8 and the ninth transistor M9 are turned off under the control of a high level of the light emission control signal em. The turned-on fifth transistor M5 supplies the signal at the third initialization signal terminal VINIT3 to the gate of the driving transistor M0 to reset the gate of the driving transistor M0.

In the data writing period T2, the fifth transistor M5 is turned off under the control of a high level of the third control signal cs3, the third transistor M3 and the sixth transistor M6 are turned off under the control of a high level of the first control signal cs1, the fourth transistor M4 and the seventh transistor M7 are turned on under the control of a low level of the second control signal cs2, and the eighth transistor M8 and the ninth transistor M9 are turned off under the control of a high level of the light emission control signal em. The turned-on fourth transistor M4 inputs the data voltage Vda at the data signal terminal DA to the first electrode of the driving transistor M0. The turned-on seventh transistor M7 conducts the gate of the driving transistor M0 to the second electrode of the driving transistor M0, so that the driving transistor M0 serves as a diode, and the gate of the driving transistor M0 can be charged with the data voltage Vda, and the voltage at the gate of the driving transistor M0 becomes Vda−Vth, where Vth represents a threshold voltage of the driving transistor M0.

In the initialization period T3, the fifth transistor M5 is turned off under the control of a high level of the third control signal cs3, the third transistor M3 and the sixth transistor M6 are turned on under the control of a low level of the first control signal cs1, the fourth transistor M4 and the seventh transistor M7 are turned off under the control of a high level of the second control signal cs2, and the eighth transistor M8 and the ninth transistor M9 are turned off under the control of a high level of the light emission control signal em. The turned-on third transistor M3 supplies the signal at the first initialization signal terminal VINIT1 to the first electrode of the driving transistor M0 to initialize the first electrode of the driving transistor M0. The turned-on sixth transistor M6 supplies the signal at the third initialization signal terminal VINIT3 to the first electrode of the light-emitting device L to initialize the first electrode of the light-emitting device L.

In the light-emitting period T4, the fifth transistor M5 is turned off under the control of a high level of the third control signal cs3, the third transistor M3 and the sixth transistor M6 are turned off under the control of a high level of the first control signal cs1, the fourth transistor M4 and the seventh transistor M7 are turned off under the control of a high level of the second control signal cs2, and the eighth transistor M8 and the ninth transistor M9 are turned on under the control of a low level of the light emission control signal em. The turned-on eighth transistor M8 conducts the first power terminal VDD to the first electrode of the driving transistor M0, so that a voltage at the first electrode of the driving transistor M0 is equal to the first power source voltage Vdd. A voltage at the gate of the driving transistor M0 is equal to Vda−Vth, and an operating current generated by the driving transistor M0 for driving the light-emitting device L to emit light is:

$$Ids\text{, which is equalt to } K[Vdd-(Vda-Vth)-Vth]^2 = K[Vdd-Vda]^2,$$

$$\text{that is, } Ids = K[Vdd-(Vda-Vth)-Vth]^2 = K[Vdd-Vda]^2.$$

Therefore, the operating current for driving the light-emitting device L to emit light is independent of the threshold voltage Vth of the driving transistor M0. Further, the leakage current at the gate of the driving transistor M0 is reduced by the signal at the leakage adjustment signal terminal VS, and the voltage at the gate of the driving transistor M0 may be further kept unchanged.

In summary, with the first transistor M1 and the second transistor M2, the leakage current at the gate of the driving transistor M0 may be reduced based on the signal at the leakage adjustment signal terminal VS, so that the Flicker problem during displaying with low gray scale can be alleviated. Furthermore, with the third transistor M3, the first electrode of the driving transistor M0 can be initialized after the data voltage is input and before the light-emitting device L is driven to emit light, so that the hysteresis effect of the driving transistor M0 can be alleviated, and the Flicker problem during displaying with high gray scale can be alleviated. Therefore, the pixel circuit provided by the embodiment of the present disclosure can compatibly solve the Flicker problem during displaying with high gray scale and the Flicker problem during displaying with low gray scale.

In addition, in the pixel circuit provided by the embodiment of the present disclosure, a buffering period T5 may be arranged between the initialization period T3 and the light-emitting period T4, and by arranging the buffering period T5, the signals in the pixel circuit may be stabilized and then enter the next period, so that the stability of the pixel circuit is further improved.

Figure 10A:
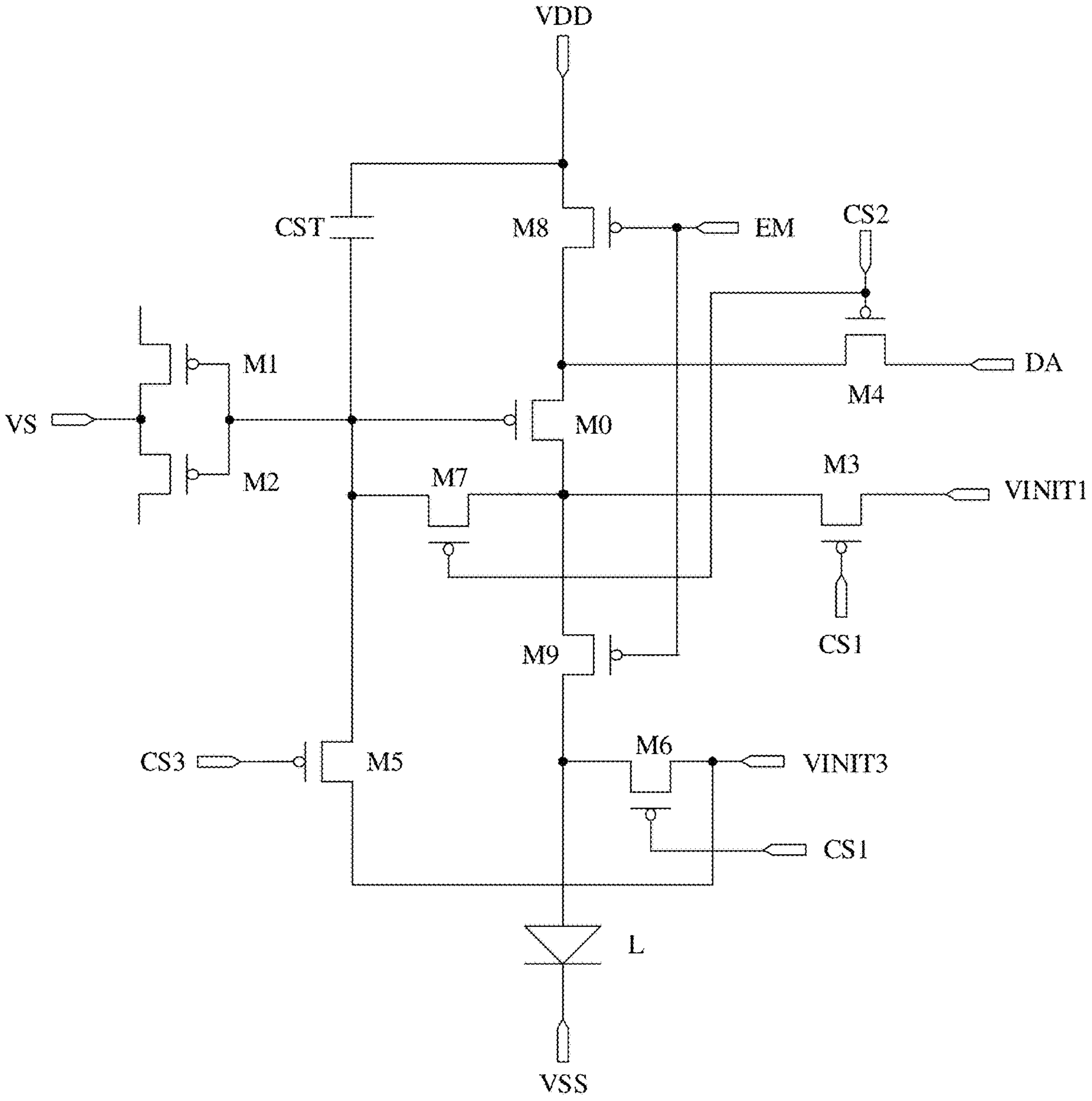
FIG. 10*a* is a schematic structural diagram of a pixel circuit according to an embodiment of the present disclosure.

An embodiment of the present disclosure provides another schematic structural diagram of a pixel circuit, as shown in FIG. 10*a*, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, the second control signal terminal CS2 and the fourth control signal terminal CS4 are a single signal terminal, so that the number of signal terminals can be reduced and the number of wires can be reduced. Illustratively, as shown in FIG. 10*a*, the gate of the fourth transistor M4 and the gate of the seventh transistor M7 are both coupled to the second control signal terminal CS2.

In some implementations of the present disclosure, as shown in FIG. 10*a*, the first setting electrode may be the second electrode of the driving transistor M0. The second control circuit 20 is coupled to the second electrode of the driving transistor M0 and the second control circuit 20 is further configured to initialize the second electrode of the driving transistor M0 after the data voltage is input.

In some implementations of the present disclosure, the second initialization signal terminal VINIT2 and the third initialization signal terminal VINIT3 are a single signal terminal, so that the number of signal terminals can be reduced and the number of wires can be reduced. Illustratively, as shown in FIG. 10*a*, the first electrode of the fifth transistor M5 and the first electrode of the sixth transistor M6 are both coupled to the third initialization signal terminal VINIT3.

A timing diagram of signals corresponding to the pixel circuit shown in FIG. 10*a* may be as shown in FIG. 9. The driving process of the pixel circuit provided by the embodiment of the present disclosure may be as follows.

The operation process of the pixel circuit in the reset period T1 may refer to the above description, and will not be described herein.

The operation process of the pixel circuit in the data writing period T2 may refer to the above description, and will not be described herein again.

In the initialization period T3, the fifth transistor M5 is turned off under the control of a high level of the third control signal cs3, the third transistor M3 and the sixth transistor M6 are turned on under the control of a low level of the first control signal cs1, the fourth transistor M4 and the seventh transistor M7 are turned off under the control of a high level of the second control signal cs2, and the eighth transistor M8 and the ninth transistor M9 are turned off under the control of a high level of the light emission control signal em. The turned-on third transistor M3 supplies the signal at the first initialization signal terminal VINIT1 to the second electrode of the driving transistor M0 to initialize the second electrode of the driving transistor M0. The turned-on sixth transistor M6 supplies the signal at the third initialization signal terminal VINIT3 to the first electrode of the light-emitting device L to initialize the first electrode of the light-emitting device L.

The operation process of the pixel circuit in the light-emitting period T4 may refer to the above description, and will not be described herein.

Figure 10B:
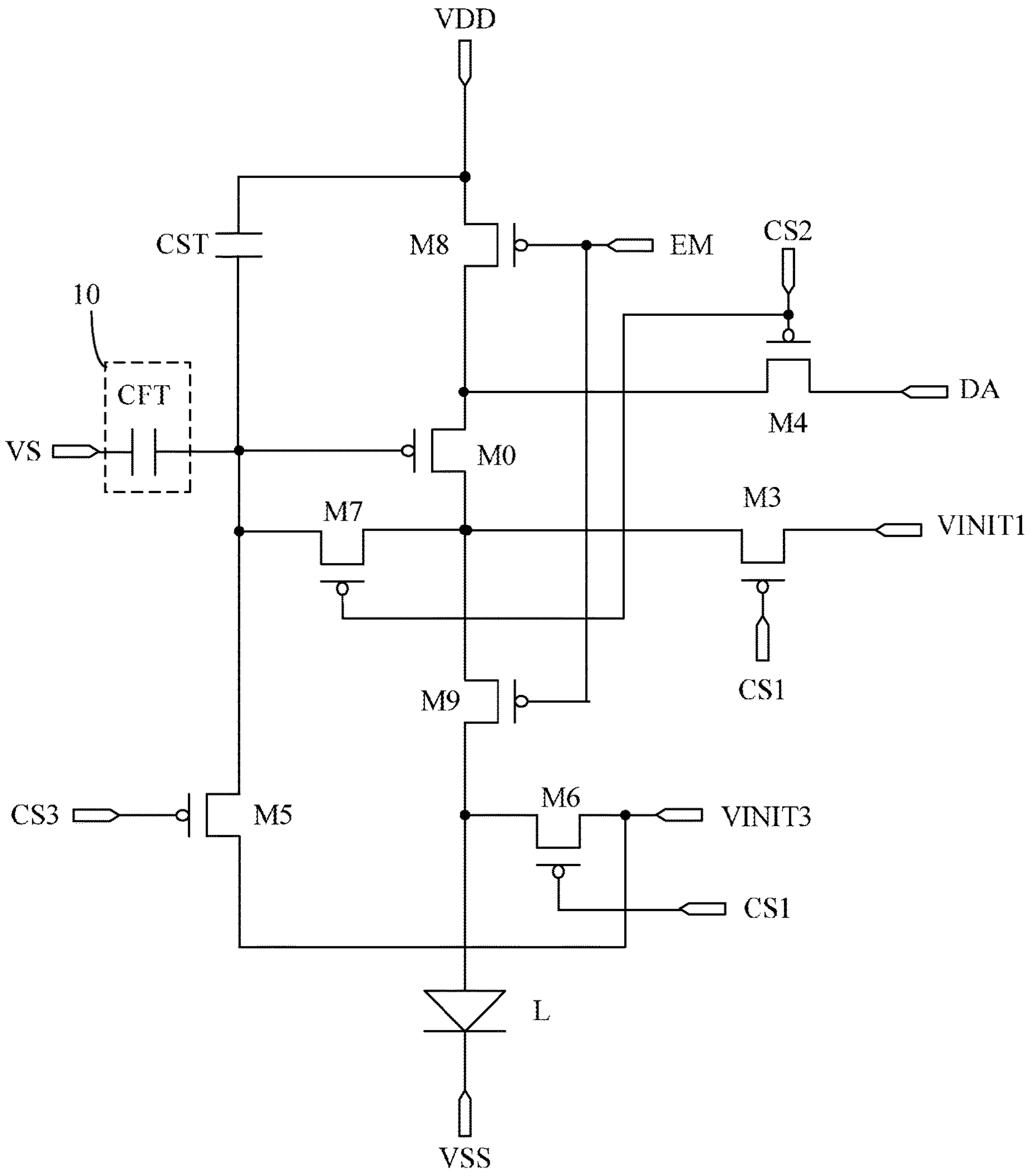
FIG. 10*b* is a schematic structural diagram of a pixel circuit according to an embodiment of the present disclosure.

An embodiment of the present disclosure provides still another schematic structural diagram of a pixel circuit, as shown in FIG. 10*b*, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, as shown in FIG. 10*b*, the first control circuit 10 may include a voltage stabilizing capacitor CFT, a first electrode of the voltage stabilizing capacitor CFT is coupled to the gate of the driving transistor M0, and a second electrode of the voltage stabilizing capacitor CFT is coupled to the leakage adjustment signal terminal VS. Thus, with the voltage stabilizing capacitor CFT, the leakage current at the gate of the driving transistor M0 can be reduced based on the signal at the leakage adjustment signal terminal VS. Therefore, the Flicker problem during displaying with low gray scale can be alleviated.

For example, the signal at the leakage adjustment signal terminal VS may be configured as described above, and is not described herein again.

A timing diagram of signals corresponding to the pixel circuit shown in FIG. 10*b* may be as shown in FIG. 9. In addition, the driving process of the pixel circuit provided in the embodiment of the present disclosure may refer to the above description, and is not repeated here.

Each sub-pixel in the display panel provided by the embodiment of the present disclosure may include any one of the pixel circuits provided by the above embodiments of the present disclosure. Furthermore, the display panel may further include a plurality of control signal lines and a driving control circuit. At least one of the control signal lines is coupled to the pixel circuits in the sub-pixels in a row, and the driving control circuit is coupled to the plurality of control signal lines.

Figure 11:
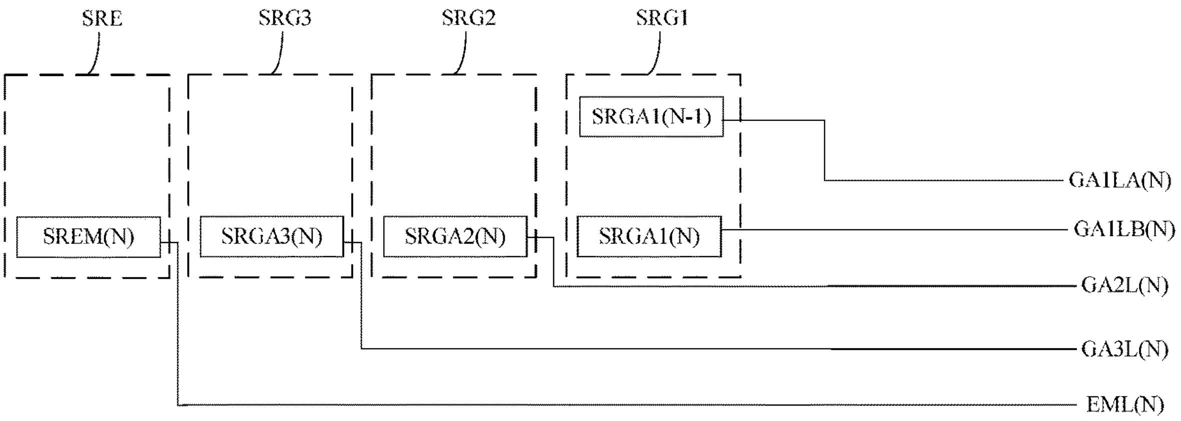
FIG. 11 is a schematic structural diagram of a display panel according to an embodiment of the present disclosure.

In some implementations of the present disclosure, in a case where the pixel circuit shown in FIG. 3 is employed in the display panel, as shown in FIG. 11, the plurality of control signal lines include a plurality of light emission control signal lines, a plurality of first scan signal lines, a plurality of second scan control signal lines, and a plurality of third scan control signal lines; each row of sub-pixels corresponds to one of the light emission control signal line, each row of sub-pixels corresponds to two of the first scan signal lines, and each row of sub-pixels corresponds to one of the second scan control signal lines and one of the third scan control signal lines. Each light emission control signal line is coupled to the light emission control signal terminals EM of the pixel circuits in a corresponding row of sub-pixels. A first first scan signal line of the two first scan signal lines is coupled to the third control signal terminals CS3 of the pixel circuits in the corresponding row of sub-pixels, and a second first scan signal line of the two first scan signal lines is coupled to the fourth control signal terminals CS4 of the pixel circuits in the corresponding row of sub-pixels. Each second scan control signal line is coupled to the second control signal terminals CS2 of the pixel circuits in the corresponding row of sub-pixels, and each third scan control signal line is coupled to the first control signal terminals CS1 of the pixel circuits in the corresponding row of sub-pixels.

Illustratively, as shown in FIG. 11, the driving control circuit includes: a light emission scan circuit SRE, a first scan control circuit SRG1, a second scan control circuit SRG2, and a third scan control circuit SRG3. The light emission scan circuit SRE includes a plurality of light emission scan shift register units which are sequentially arranged; the light emission control signal line coupled to each row of sub-pixels is correspondingly coupled to one of the light emission scan shift register units.

Illustratively, as shown in FIG. 11, the first scan control circuit SRG1 includes a plurality of first scan control shift register units arranged in sequence; in every two adjacent rows of sub-pixels, a first first scan control signal line coupled to the sub-pixels in a latter row and a second first scan control signal line coupled to the sub-pixels in a former row are correspondingly coupled to a same first scan control shift register unit.

Illustratively, as shown in FIG. 11, the second scan control circuit SRG2 includes a plurality of second scan control shift register units arranged in sequence; the second scan control signal line coupled to each row of sub-pixels is correspondingly coupled to one of the second scan control shift register units.

Illustratively, as shown in FIG. 11, the third scan control circuit SRG3 includes a plurality of third scan control shift register units arranged in sequence; the third scan control signal line coupled to each row of sub-pixels is correspondingly coupled to one of the third scan control shift register units.

Illustratively, FIG. 11 shows one light emission scan shift register unit SREM(N) in the light emission scan circuit SRE, two adjacent first scan control shift register units SRGA1(N−1) to SRGA1(N) in the first scan control circuit SRG1, one second scan control shift register unit SRGA2 (N) in the second scan control circuit SRG2, and one third scan control shift register unit SRGA3(N) in the third scan control circuit SRG3. An $N^{th}$ light emission scan shift register unit SREM(N) in the light emission scan circuit SRE is coupled to a light emission control signal line EML(N) corresponding to an $N^{th}$ row of sub-pixels. An $(N-1)^{th}$ first scan control shift register unit SRGA1(N−1) in the first scan control circuit SRG1 is coupled to a first first scan control signal line GA1LA(N) corresponding to the Nu row of sub-pixels, and an $N^{th}$ first scan control shift register unit SRGA1(N) is coupled to a second first scan control signal line GA1LB(N) corresponding to the $N^{th}$ row of sub-pixels. An $N^{th}$ second scan control shift register unit SRGA2(N) in the second scan control circuit SRG2 is coupled to a second scan control signal line GA2L(N) corresponding to the $N^{th}$ row of sub-pixels. An $N^{th}$ third scan control shift register unit SRGA3(N) in the third scan control circuit SRG3 is coupled to a third scan control signal line GA3L(N) corresponding to the $N^{th}$ row of sub-pixels.

Figure 12:
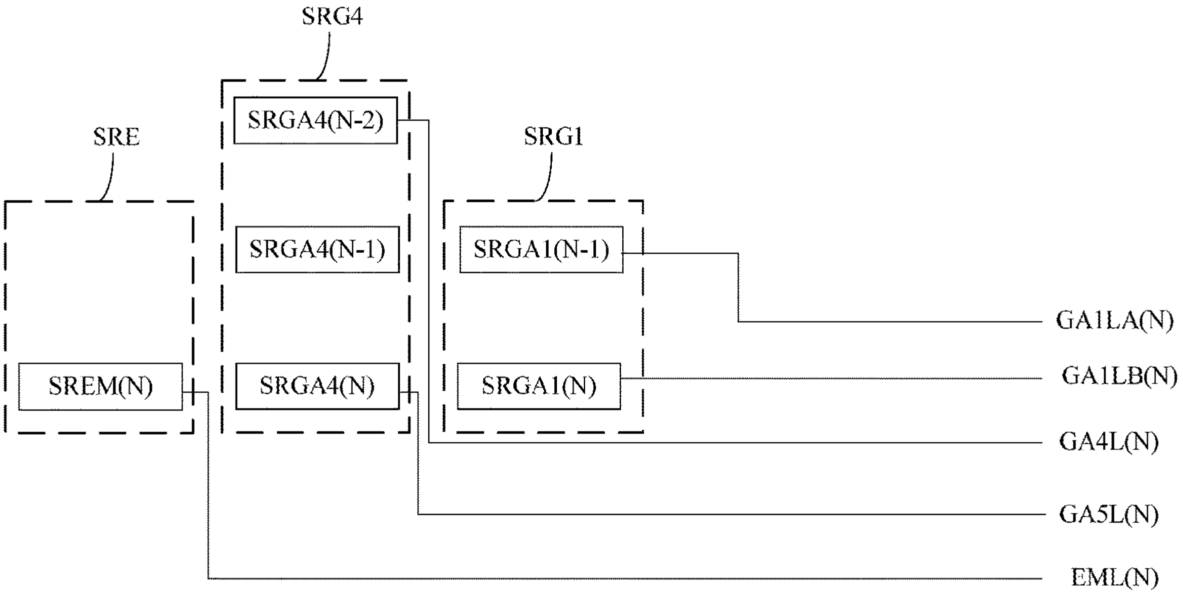
FIG. 12 is a schematic structural diagram of a display panel according to an embodiment of the present disclosure.

An embodiment of the present disclosure provides another schematic structural diagram of a pixel circuit, as shown in FIG. 12, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, in a case where the pixel circuit shown in FIG. 3 is employed in the display panel, as shown in FIG. 12, the plurality of control signal lines include a plurality of light emission control signal lines, a plurality of first scan signal lines, a plurality of fourth scan control signal lines, and a plurality of fifth scan control signal lines; each row of sub-pixels corresponds to one of the light emission control signal lines, each row of sub-pixels corresponds to two of the first scan signal lines, and each row of sub-pixels corresponds to one of the fourth scan control signal lines and one of the fifth scan control signal lines. Furthermore, each light emission control signal line is coupled to the emission control signal terminals EM of the pixel circuits in a corresponding row of sub-pixels. A first first scan signal line of the two first scan signal lines is coupled to the third control signal terminals CS3 of the pixel circuits in the corresponding row of sub-pixels, and a second first scan signal line of the two first scan signal lines is coupled to the fourth control signal terminals CS4 of the pixel circuits in the corresponding row of sub-pixels. Each fourth scan control signal line is coupled to the second control signal terminals CS2 of the pixel circuits in the corresponding row of sub-pixels, and each fifth scan control signal line is coupled to the first control signal terminals CS1 of the pixel circuits in the corresponding row of sub-pixels.

Illustratively, as shown in FIG. 12, the driving control circuit includes: a light emission scan circuit SRE, a first scan control circuit SRG1, and a fourth scan control circuit SRG4. The light emission scan circuit SRE includes a plurality of light emission scan shift register units arranged in sequence; the light emission control signal line coupled to each row of sub-pixels is correspondingly coupled to one of the light emission scan shift register units.

Illustratively, as shown in FIG. 12, the first scan control circuit SRG1 includes a plurality of first scan control shift register units arranged in sequence; in every two adjacent rows of sub-pixels, the first first scan control signal line coupled to a latter row of sub-pixels and the second first scan control signal line coupled to a former row of sub-pixels are correspondingly coupled to a same first scan control shift register unit.

Illustratively, as shown in FIG. 12, the fourth scan control circuit SRG4 includes a plurality of fourth scan control shift register units arranged in sequence; in every adjacent three rows of sub-pixels, the fifth scan control signal line coupled to a third row of sub-pixels and the fourth scan control signal line coupled to a first row of sub-pixels are correspondingly coupled to a same fourth scan control shift register unit.

Illustratively, FIG. 12 shows one light emission scan shift register unit SREM(N) in the light emission scan circuit SRE, two adjacent first scan control shift register units SRGA1(N−1) to SRGA1(N) in the first scan control circuit SRG1, and three adjacent fourth scan control shift register units SRGA4(N−2) to SRGA4(N) in the fourth scan control circuit SRG4. An $N^{th}$ light emission scan shift register unit SREM(N) in the light emission scan circuit SRE is coupled to a light emission control signal line EML(N) corresponding to an $N^{th}$ row of sub-pixels. An $(N-1)^{th}$ first scan control shift register unit SRGA1(N−1) in the first scan control circuit SRG1 is coupled to a first first scan control signal line GA1LA(N) corresponding to the $N^{th}$ row of sub-pixels, and an $N^{th}$ first scan control shift register unit SRGA1(N) is coupled to a second first scan control signal line GA1LB(N) corresponding to the $N^{th}$ row of sub-pixels. An $(N-2)^{th}$ fourth scan control shift register unit SRGA4(N−2) in the fourth scan control circuit SRG4 is coupled to a fourth scan control signal line GA4L(N) corresponding to the $N^{th}$ row of sub-pixels, and an $N^{th}$ fourth scan control shift register unit SRGA4(N) is coupled to a fifth scan control signal line GA5L(N) corresponding to the $N^{th}$ row of sub-pixels.

Figure 13:
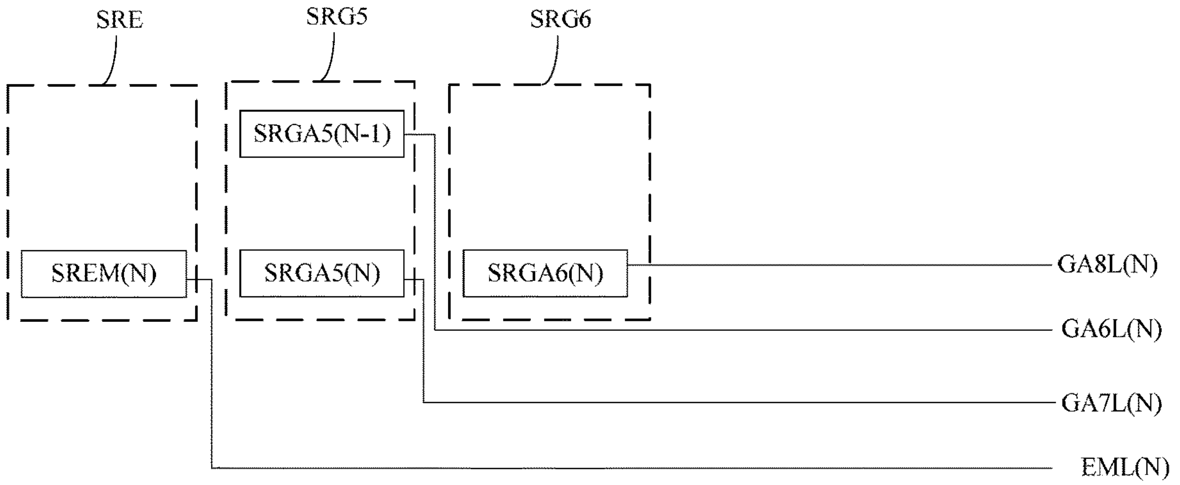
FIG. 13 is a schematic structural diagram of a display panel according to an embodiment of the present disclosure.

An embodiment of the present disclosure provides another schematic structural diagram of a pixel circuit, as shown in FIG. 13, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, in a case where one of the pixel circuits shown in FIGS. 8, 10*a* and 10*b* is employed in the display panel, as shown in FIG. 13, the plurality of control signal lines include a plurality of light emission control signal lines, a plurality of sixth scan control signal lines, a plurality of seventh scan control signal lines, and a plurality of eighth scan control signal lines; each row of sub-pixels corresponds to one of the light emission control signal lines, and each row of sub-pixels corresponds to one of the sixth scan control signal lines, one of the seventh scan control signal line and one of the eighth scan control signal lines. Each emission control signal line is coupled to the light emission control signal terminals EM of the pixel circuits in a corresponding row of sub-pixels. Each sixth scan control signal line is coupled to the third control signal terminals CS3 of the pixel circuits in the corresponding row of sub-pixels, each seventh scan control signal line is coupled to the second control signal terminals CS2 of the pixel circuits in the corresponding row of sub-pixels, and each eighth scan control signal line is coupled to the first control signal terminals CS1 of the pixel circuits in the corresponding row of sub-pixels.

Illustratively, as shown in FIG. 13, the driving control circuit includes: a light emission scan circuit SRE including a plurality of light emission scan shift register units arranged in sequence; the light emission control signal line coupled to each row of sub-pixels is correspondingly coupled to one of the light emission scan shift register units.

Illustratively, as shown in FIG. 13, the driving control circuit includes: a fifth scan control circuit SRG5 and a sixth scan control circuit SRG6. The fifth scan control circuit SRG5 includes a plurality of fifth scan control shift register units that are sequentially arranged; in every two adjacent rows of sub-pixels, the sixth scan control signal line coupled to a latter row of sub-pixels and the seventh scan control signal line coupled to a former row of sub-pixels are correspondingly coupled to a same fifth scan control shift register unit. The sixth scan control circuit SRG6 includes a plurality of sixth scan control shift register units that are sequentially arranged; the eighth scan control signal line coupled to each row of sub-pixels is correspondingly coupled to one of the sixth scan control shift register units.

Illustratively, FIG. 13 shows one light emission scan shift register unit SREM(N) in the light emission scan circuit SRE, one sixth scan control shift register unit SRGA6(N) in the sixth scan control circuit SRG6, and two adjacent fifth scan control shift register units SRGA5(N−1) to SRGA5(N) in the fifth scan control circuit SRG5. An $N^{th}$ light emission scan shift register unit SREM(N) in the light emission scan circuit SRE is coupled to a light emission control signal line EML(N) corresponding to an $N^{th}$ row of sub-pixels. An $N^{th}$ sixth scan control shift register unit SRGA6(N) in the sixth scan control circuit SRG6 is coupled to an eighth scan control signal line GA8L(N) corresponding to the $N^{th}$ row of sub-pixels. An $(N-1)^{th}$ fifth scan control shift register unit SRGA5(N−1) in the fifth scan control circuit SRG5 is coupled to a sixth scan control signal line GA6L(N) corresponding to the $N^{th}$ row of sub-pixels, and an $N^{th}$ fifth scan control shift register unit SRGA5(N) is coupled to a seventh scan control signal line GA7L(N) corresponding to the $N^{th}$ row of sub-pixels.

Figure 14:
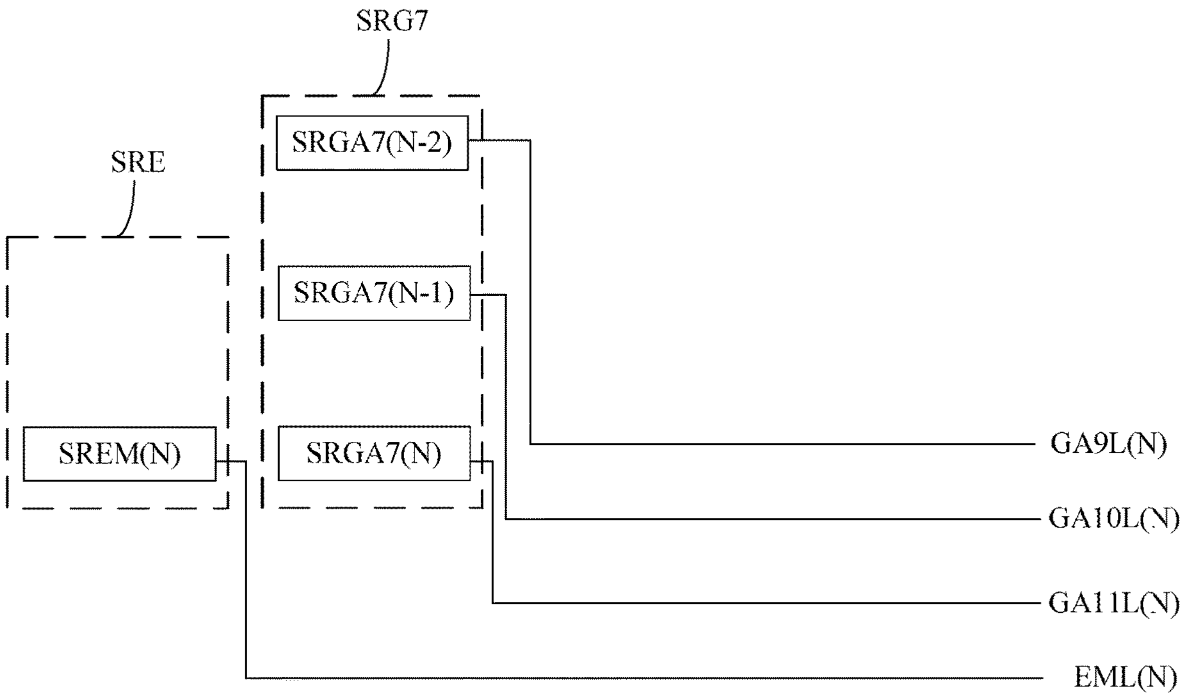
FIG. 14 is a schematic structural diagram of a display panel according to an embodiment of the present disclosure.

An embodiment of the present disclosure provides another schematic structural diagram of a pixel circuit, as shown in FIG. 14, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, in a case where one of the pixel circuits shown in FIGS. 8, 10*a* and 10*b* is employed in the display panel, as shown in FIG. 14, the plurality of control signal lines include a plurality of light emission control signal lines, a plurality of ninth scan control signal lines, a plurality of tenth scan control signal lines, and a plurality of eleventh scan control signal lines; each row of sub-pixels corresponds to one of the ninth scan control signal lines, one of the tenth scan control signal lines and one of the eleventh scan control signal lines. Each light emission control signal line is coupled to the light emission control signal terminals EM of the pixel circuits in a corresponding row of sub-pixels. Each ninth scan control signal line is coupled to the third control signal terminals CS3 of the pixel circuits in the corresponding row of sub-pixels, each tenth scan control signal line is coupled to the second control signal terminals CS2 of the pixel circuits in the corresponding row of sub-pixels, and each eleventh scan control signal line is coupled to the first control signal terminals CS1 of the pixel circuits in the corresponding row of sub-pixels.

Illustratively, as shown in FIG. 14, the driving control circuit includes: a light emission scan circuit SRE including a plurality of light emission scan shift register units sequentially arranged; the light emission control signal line coupled to each row of sub-pixels is correspondingly coupled to one of the light emission scan shift register units.

Illustratively, as shown in FIG. 14, the driving control circuit includes a seventh scan control circuit SRG7, the seventh scan control circuit SRG7 including a plurality of seventh scan control shift register units arranged in sequence; in every two adjacent rows of sub-pixels, a ninth scan control signal line coupled to a latter row of sub-pixels and a tenth scan control signal line coupled to a former row of sub-pixels are correspondingly coupled to a same seventh scan control shift register unit, and a tenth scan control signal line coupled to the latter row of sub-pixels and an eleventh scan control signal line coupled to the former row of sub-pixels are correspondingly coupled to a same seventh scan control shift register unit.

Illustratively, FIG. 14 shows one light emission scan shift register unit SREM(N) in the light emission scan circuit SRE, and three adjacent seventh scan control shift register units SRGA7(N−2) to SRGA7(N) in the seventh scan control circuit SRG7. An $N^{th}$ light emission scan shift register unit SREM(N) in the light emission scan circuit SRE is coupled to a light emission control signal line EML(N) corresponding to an $N^{th}$ row of sub-pixels. An $(N-2)^{th}$ seventh scan control shift register unit SRGA7(N−2) in the seventh scan control circuit SRG7 is coupled to a ninth scan control signal line GA9L(N) corresponding to the Nu row of sub-pixels, an $(N-1)^{th}$ seventh scan control shift register unit SRGA7(N−1) is coupled to a tenth scan control signal line GA10L(N) corresponding to the Nu row of sub-pixels, and an $N^{th}$ seventh scan control shift register unit SRGA7(N) is coupled to an eleventh scan control signal line GA11L(N) corresponding to the $N^{th}$ row of sub-pixels.

Figure 15:
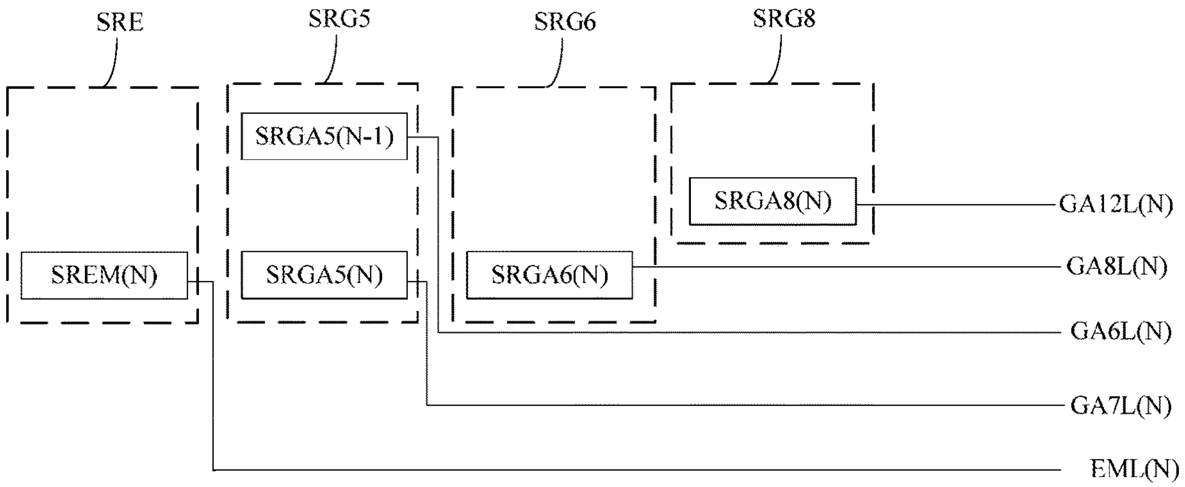
FIG. 15 is a schematic structural diagram of a display panel according to an embodiment of the present disclosure.

An embodiment of the present disclosure provides another schematic structural diagram of a pixel circuit, as shown in FIG. 15, which is obtained by modifying the implementations in the foregoing embodiment. Only the differences between the present embodiment and the above embodiment will be described below, and the same parts between the present embodiment and the above embodiment will not be described herein again.

In some implementations of the present disclosure, in a case where the pixel circuit shown in FIG. 6 is employed in the display panel, as shown in FIG. 15, the plurality of control signal lines include a plurality of light emission control signal lines, a plurality of sixth scan control signal lines, a plurality of seventh scan control signal lines, a plurality of eighth scan control signal lines, and a plurality of twelfth scan control signal lines, where each row of sub-pixels corresponds to one of the light emission control signal lines, each row of sub-pixels corresponds to one of the sixth scan control signal lines, one of the seventh scan control signal lines and one of the eighth scan control signal lines, and each row of sub-pixels corresponds to one of the twelfth scan control signal lines. Each light emission control signal line is coupled to the light emission control signal terminals EM of the pixel circuits in a corresponding row of sub-pixels. Each sixth scan control signal lines is coupled to the third control signal terminals CS3 of the pixel circuits in the corresponding row of sub-pixels, each seventh scan control signal line is coupled to the second control signal terminals CS2 of the pixel circuits in the corresponding row of sub-pixels, and each eighth scan control signal line is coupled to the first control signal terminals CS1 of the pixel circuits in the corresponding row of sub-pixels. Each twelfth scan control signal line is coupled to the fourth control signal terminals CS4 of the pixel circuits in the corresponding row of sub-pixels.

Illustratively, as shown in FIG. 15, the driving control circuit includes: a fifth scan control circuit SRG5, and a sixth scan control circuit SRG6. The fifth scan control circuit SRG5 includes a plurality of fifth scan control shift register units that are sequentially arranged; in every two adjacent rows of sub-pixels, a sixth scan control signal line coupled to a latter row of sub-pixels and a seventh scan control signal line coupled to a former row of sub-pixels are correspondingly coupled to a same fifth scan control shift register unit. The sixth scan control circuit SRG6 includes a plurality of sixth scan control shift register units that are sequentially arranged; an eighth scan control signal line coupled to each row of sub-pixels is correspondingly coupled to one of the sixth scan control shift register units.

Illustratively, as shown in FIG. 15, the driving control circuit includes: an eighth scan control circuit SRG8, the eighth scan control circuit SRG8 including a plurality of eighth scan control shift register units arranged in sequence; a twelfth scan control signal line coupled to each row of sub-pixels is correspondingly coupled to one of the eighth scan control shift register units.

Illustratively, FIG. 15 shows one light emission scan shift register unit SREM(N) in the light emission scan circuit SRE, one sixth scan control shift register unit SRGA6(N) in the sixth scan control circuit SRG6, two adjacent fifth scan control shift register units SRGA5(N−1) to SRGA5(N) in the fifth scan control circuit SRG5, and one eighth scan control shift register unit SRGA8(N) in the eighth scan control circuit SRG8, where an $N^{th}$ light emission scan shift register unit SREM(N) in the light emission scan circuit SRE is coupled to a light emission control signal line EML(N) corresponding to an $N^{th}$ row of sub-pixels. An $N^{th}$ sixth scan control shift register unit SRGA6(N) in the sixth scan control circuit SRG6 is coupled to an eighth scan control signal line GA8L(N) corresponding to the Nu row of sub-pixels. An $(N-1)^{th}$ fifth scan control shift register unit SRGA5(N−1) in the fifth scan control circuit SRG5 is coupled to a sixth scan control signal line GA6L(N) corresponding to the $N^{th}$ row of sub-pixels, and an $N^{th}$ fifth scan control shift register unit SRGA5(N) is coupled to a seventh scan control signal line GA7L(N) corresponding to the $N^{th}$ row of sub-pixels. An $N^{th}$ eighth scan control shift register unit SRGA8(N) in the eighth scan control circuit SRG8 is coupled to a twelfth scan control signal line GA12L(N) corresponding to the $N^{th}$ row of sub-pixels.

An embodiment of the present disclosure further provides a display apparatus which includes the display panel provided by the embodiment of the present disclosure. The principle of the display apparatus for solving the problems is similar to that of the display panel, so the implementation of the display apparatus can refer to the implementations of the display panel, and the same parts are not described herein again.

In a specific implementation, the display apparatus in the embodiment of the present disclosure may be: any product or component with a display function, such as a mobile phone, a tablet computer, a television, a display, a notebook computer, a digital photo frame, a navigator and the like. Other essential components of the display apparatus are understood by those skilled in the art, and are not described herein or should not be construed as limiting the present disclosure.

While the embodiments of the present disclosure have been described, additional variations and modifications in those embodiments may occur to those skilled in the art once they learn of the basic concept. Therefore, it is intended that the appended claims should be interpreted as including the embodiments and all variations and modifications that fall within the scope of the present disclosure.

It will be apparent to those skilled in the art that various changes and modifications may be made in the embodiments of the disclosure without departing from the spirit and scope of the embodiments of the present disclosure. Thus, if such modifications and variations of the embodiments of the present disclosure are within the scope of the claims of the present disclosure and their equivalents, the present disclosure is also intended to encompass such modifications and changes.

What is claimed is:

1. A pixel circuit, comprising:

a light-emitting device;

a driving transistor coupled to the light-emitting device and configured to generate an operating current for driving the light-emitting device according to a data voltage;

a first control circuit coupled to a gate of the driving transistor and configured to reduce a leakage current at the gate of the driving transistor based on a signal at a leakage adjustment signal terminal;

a second control circuit coupled to a first setting electrode of the driving transistor and configured to initialize the first setting electrode of the driving transistor before the light-emitting device is driven to emit light, wherein the first setting electrode of the driving transistor is a first electrode and/or a second electrode of the driving transistor; and a third control circuit coupled to the driving transistor and configured to reset the gate of the driving transistor, control the data voltage to be input into the gate of the driving transistor, and control the driving transistor to generate the operating current and drive the light-emitting device to emit light, wherein the first control circuit comprises: a first transistor and a second transistor; a gate of the first transistor is coupled to the gate of the driving transistor, a first electrode of the first transistor is floated, and a second electrode of the first transistor is coupled to the leakage adjustment signal terminal; and a gate of the second transistor is coupled to the gate of the driving transistor, a first electrode of the second transistor is floated, and a second electrode of the second transistor is coupled to the leakage adjustment signal terminal, or the first control circuit comprises: a voltage stabilizing capacitor; and a first electrode of the voltage stabilizing capacitor is coupled to the gate of the driving transistor, and a second electrode of the voltage stabilizing capacitor is coupled to the leakage adjustment signal terminal, wherein when the data voltage is input into the driving transistor, the voltage of the signal at the leakage adjustment signal terminal is greater than a difference between the data voltage and a threshold voltage of the driving transistor.

2. The pixel circuit according to claim 1, wherein in each display frame, when the gate of the driving transistor is reset, a voltage of a signal at the leakage adjustment signal terminal is a first voltage, and when the data voltage is input to the gate of the driving transistor, the voltage of the signal at the leakage adjustment signal terminal is a second voltage; and the second voltage is not less than the first voltage.

3. The pixel circuit according to claim 2, wherein the first voltages for different display frames are the same;

for different display frames, the second voltage is greater than a third voltage; and the third voltage is equal to Vda−Vth, Vda representing the data voltage, and Vth representing a threshold voltage of the driving transistor; and the second voltages for different display frames are the same; or the second voltages for different display frames each increase as the third voltage increases.

4. The pixel circuit according to claim 1, wherein the second control circuit is further configured to supply, in response to a signal at a first control signal terminal, a signal at a first initialization signal terminal to the first setting electrode of the driving transistor after the data voltage is input, and wherein the signal at the first initialization signal terminal is at a high level or a low level, and in a case where the first initialization signal terminal is at a high level, the first initialization signal terminal and a first power terminal are a single signal terminal.

5. The pixel circuit according to claim 4, wherein the second control circuit comprises a third transistor, and a gate of the third transistor is coupled to the first control signal terminal, a first electrode of the third transistor is coupled to the first initialization signal terminal, and a second electrode of the third transistor is coupled to the first setting electrode of the driving transistor.

6. The pixel circuit according to claim 1, wherein the third control circuit comprises:

a data writing circuit configured to input the data voltage at a data signal terminal to the first electrode of the driving transistor in response to a signal at a second control signal terminal;

a reset circuit configured to input a signal at a second initialization signal terminal to a second setting electrode of the driving transistor in response to a signal at a third control signal terminal; the second setting electrode of the driving transistor being a gate or a second electrode of the driving transistor;

an initialization circuit configured to input a signal at a third initialization signal terminal to a first electrode of the light-emitting device in response to a signal at a first control signal terminal;

a threshold compensation circuit configured to conduct the gate of the driving transistor to the second electrode of the driving transistor in response to a signal at a fourth control signal terminal; and a light emission control circuit configured to conduct the first electrode of the driving transistor to a first power terminal and conduct the second electrode of the driving transistor to the first electrode of the light-emitting device in response to a signal at a light emission control signal terminal, to control the operating current generated by the driving transistor to be inputted to the light-emitting device.

7. The pixel circuit according to claim 6, wherein the data writing circuit comprises a fourth transistor, a gate of the fourth transistor is coupled to the second control signal terminal, a first electrode of the fourth transistor is coupled to the data signal terminal, a second electrode of the fourth transistor is coupled to the first electrode of the driving transistor;

the reset circuit comprises a fifth transistor, a gate of the fifth transistor is coupled to the third control signal terminal, a first electrode of the fifth transistor is coupled to the second initialization signal terminal, and a second electrode of the fifth transistor is coupled to the second setting electrode of the driving transistor;

the initialization circuit comprises a sixth transistor, a gate of the sixth transistor is coupled to the first control signal terminal, a first electrode of the sixth transistor is coupled to the third initialization signal terminal, and a second electrode of the sixth transistor is coupled to the first electrode of the light-emitting device;

the threshold compensation circuit comprises a seventh transistor and a storage capacitor, wherein a gate of the seventh transistor is coupled to the fourth control signal terminal, a first electrode of the seventh transistor is coupled to the gate of the driving transistor, a second electrode of the seventh transistor is coupled to the second electrode of the driving transistor, a first electrode of the storage capacitor is coupled to the first power terminal, and a second electrode of the storage capacitor is coupled to the gate of the driving transistor; and the light emission control circuit comprises an eighth transistor and a ninth transistor, a gate of the eighth transistor is coupled to the light emission control signal terminal, a first electrode of the eighth transistor is coupled to the first power terminal, a second electrode of the eighth transistor is coupled to the first electrode of the driving transistor, a gate of the ninth transistor is coupled to the light emission control signal terminal, a first electrode of the ninth transistor is coupled to the second electrode of the driving transistor, and a second electrode of the ninth transistor is coupled to the first electrode of the light-emitting device.

8. The pixel circuit according to claim 7, wherein the second control signal terminal and the fourth control signal terminal are a single signal terminal or signal terminals independent from each other, and wherein in each display frame, an active level of the signal at the first control signal terminal is later than an active level of the signal at the second control signal terminal.

9. A method for driving the pixel circuit according to claim 1, comprising:

in a reset period, resetting, by the third control circuit, the gate of the driving transistor;

in a data writing period, controlling, by the third control circuit, the data voltage to be input into the gate of the driving transistor;

in an initialization period, initializing, by the second control circuit, the first setting electrode of the driving transistor; and in a light-emitting period, reducing, by the first control circuit, the leakage current at the gate of the driving transistor based on the signal at the leakage adjustment signal terminal; and controlling, by the third control circuit, the driving transistor to generate the operating current to drive the light-emitting device to emit light.

10. The method according to claim 9, further comprising:

in the reset period, in response to a signal at a third control signal terminal, inputting, by the reset circuit, a signal at a second initialization signal terminal into a second setting electrode of the driving transistor;

in the initialization period, inputting, by the initialization circuit, a signal at a third initialization signal terminal to the first electrode of the light-emitting device in response to a signal at a first control signal terminal;

in the data writing period, in response to a signal at a second control signal terminal, inputting, by the data writing circuit, the data voltage at a data signal terminal into the first electrode of the driving transistor; in response to the signal at the second control signal terminal, conducting, by the threshold compensation circuit, the gate of the driving transistor to the second electrode of the driving transistor;

in the light-emitting period, by the light emission control circuit, conducting the first electrode of the driving transistor to a first power terminal, conducting the second electrode of the driving transistor to the first electrode of the light-emitting device, and controlling the operating current generated by the driving transistor to be input into the light-emitting device, in response to a signal at a light emission control signal terminal.

11. A display panel, comprising:

a plurality of sub-pixels, each of the sub-pixels comprising a pixel circuit according to claim 1;

a plurality of control signal lines, at least one of the plurality of control signal lines being coupled to the pixel circuits in a row of sub-pixels; and a driving control circuit coupled to the plurality of control signal lines.

12. The display panel according to claim 11, wherein the plurality of control signal lines comprise a plurality of light emission control signal lines; each row of sub-pixels correspond to one of the light emission control signal lines, and each light emission control signal line is coupled to light emission control signal terminals of the pixel circuits in a corresponding row of sub-pixels; and the driving control circuit comprises: a light emission scan circuit comprising a plurality of light emission scan shift register units arranged in sequence; the light emission control signal line coupled to each row of sub-pixels is correspondingly coupled to one of the light emission scan shift register units.

13. The display panel according to claim 12, wherein the plurality of control signal lines further comprises a plurality of ninth scan control signal lines, a plurality of tenth scan control signal lines, and a plurality of eleventh scan control signal lines; each row of sub-pixels corresponds to one of the ninth scan control signal lines, one of the tenth scan control signal lines and one of the eleventh scan control signal lines, each ninth scan control signal line is coupled to the third control signal terminals of the pixel circuits in the corresponding row of sub-pixels, each tenth scan control signal line is coupled to the second control signal terminals of the pixel circuits in the corresponding row of sub-pixels, and each eleventh scan control signal line is coupled to the first control signal terminals of the pixel circuits in the corresponding row of sub-pixels; and the driving control circuit comprises a seventh scan control circuit comprising a plurality of seventh scan control shift register units which are sequentially arranged; in every two adjacent rows of sub-pixels, a ninth scan control signal line coupled to a latter row of sub-pixels and a tenth scan control signal line coupled to a former row of sub-pixels are correspondingly coupled to a same seventh scan control shift register unit, and a tenth scan control signal line coupled to the latter row of sub-pixels and an eleventh scan control signal line coupled to the former row of sub-pixels are correspondingly coupled to a same seventh scan control shift register unit.

14. A display panel, comprising:

a plurality of sub-pixels, each of the sub-pixels comprising a pixel circuit, the pixel circuit comprises: a light-emitting device; a driving transistor coupled to the light-emitting device and configured to generate an operating current for driving the light-emitting device according to a data voltage; a first control circuit coupled to a gate of the driving transistor and configured to reduce a leakage current at the gate of the driving transistor based on a signal at a leakage adjustment signal terminal; a second control circuit coupled to a first setting electrode of the driving transistor and configured to initialize the first setting electrode of the driving transistor before the light-emitting device is driven to emit light, wherein the first setting electrode of the driving transistor is a first electrode and/or a second electrode of the driving transistor; and a third control circuit coupled to the driving transistor and configured to reset the gate of the driving transistor, control the data voltage to be input into the gate of the driving transistor, and control the driving transistor to generate the operating current and drive the light-emitting device to emit light;

a plurality of control signal lines, at least one of the plurality of control signal lines being coupled to the pixel circuits in a row of sub-pixels; and a driving control circuit coupled to the plurality of control signal lines, wherein the plurality of control signal lines comprise a plurality of light emission control signal lines; each row of sub-pixels correspond to one of the light emission control signal lines, and each light emission control signal line is coupled to light emission control signal terminals of the pixel circuits in a corresponding row of sub-pixels; and the driving control circuit comprises: a light emission scan circuit comprising a plurality of light emission scan shift register units arranged in sequence; the light emission control signal line coupled to each row of sub-pixels is correspondingly coupled to one of the light emission scan shift register units, and wherein the plurality of control signal lines comprise a plurality of first scan signal lines; each row of sub-pixels correspond to two first scan signal lines, a first first scan signal line of the two first scan signal lines is coupled to third control signal terminals of the pixel circuits in a corresponding row of sub-pixels, and a second first scan signal line of the two first scan signal lines is coupled to fourth control signal terminals of the pixel circuits in the corresponding row of sub-pixels; and the driving control circuit comprises: a first scan control circuit comprising a plurality of first scan control shift register units arranged in sequence; in every two adjacent rows of sub-pixels, the first first scan control signal line coupled to a latter row of sub-pixels and the second first scan control signal line coupled to a former row of sub-pixels are correspondingly coupled to a same first scan control shift register unit.

15. The display panel according to claim 14, wherein the plurality of control signal lines further comprises a plurality of second scan control signal lines and a plurality of third scan control signal lines; each row of sub-pixels corresponds to one of the second scan control signal lines and one of the third scan control signal lines, each second scan control signal line is coupled to second control signal terminals of the pixel circuits in a corresponding row of sub-pixels, and each third scan control signal line is coupled to first control signal terminals of the pixel circuits in the corresponding row of sub-pixels;

the driving control circuit comprises: a second scan control circuit and a third scan control circuit;

the second scan control circuit comprises a plurality of second scan control shift register units which are arranged in sequence; a second scan control signal line coupled to each row of sub-pixels is correspondingly coupled to one of the second scan control shift register units; and the third scan control circuit comprises a plurality of third scan control shift register units which are arranged in sequence; a third scan control signal line coupled to each row of sub-pixels is correspondingly coupled to one of the third scan control shift register units.

16. The display panel of claim 14, wherein the plurality of control signal lines further comprises a plurality of fourth scan control signal lines and a plurality of fifth scan control signal lines; each row of sub-pixels corresponds to one of the fourth scan control signal lines and one of the fifth scan control signal lines, each fourth scan control signal line is coupled to the second control signal terminals of the pixel circuits in the corresponding row of sub-pixels, and each fifth scan control signal line is coupled to the first control signal terminal of the pixel circuits in the corresponding row of sub-pixels; and the driving control circuit comprises: a fourth scan control circuit comprising a plurality of fourth scan control shift register units which are sequentially arranged; in every three adjacent rows of sub-pixels, a fifth scan control signal line coupled to a third row of sub-pixels and a fourth scan control signal line coupled to a first row of sub-pixels are correspondingly coupled to a same fourth scan control shift register unit.

17. A display panel, comprising:

a plurality of sub-pixels, each of the sub-pixels comprising a pixel circuit, the pixel circuit comprises: a light-emitting device; a driving transistor coupled to the light-emitting device and configured to generate an operating current for driving the light-emitting device according to a data voltage; a first control circuit coupled to a gate of the driving transistor and configured to reduce a leakage current at the gate of the driving transistor based on a signal at a leakage adjustment signal terminal; a second control circuit coupled to a first setting electrode of the driving transistor and configured to initialize the first setting electrode of the driving transistor before the light-emitting device is driven to emit light, wherein the first setting electrode of the driving transistor is a first electrode and/or a second electrode of the driving transistor; and a third control circuit coupled to the driving transistor and configured to reset the gate of the driving transistor, control the data voltage to be input into the gate of the driving transistor, and control the driving transistor to generate the operating current and drive the light-emitting device to emit light;

a plurality of control signal lines, at least one of the plurality of control signal lines being coupled to the pixel circuits in a row of sub-pixels; and a driving control circuit coupled to the plurality of control signal lines, wherein the plurality of control signal lines comprise a plurality of light emission control signal lines; each row of sub-pixels correspond to one of the light emission control signal lines, and each light emission control signal line is coupled to light emission control signal terminals of the pixel circuits in a corresponding row of sub-pixels; and the driving control circuit comprises: a light emission scan circuit comprising a plurality of light emission scan shift register units arranged in sequence; the light emission control signal line coupled to each row of sub-pixels is correspondingly coupled to one of the light emission scan shift register units, and wherein the plurality of control signal lines further comprises a plurality of sixth scan control signal lines, a plurality of seventh scan control signal lines, and a plurality of eighth scan control signal lines; each row of sub-pixels correspond to one of the sixth scan control signal lines, one of the seventh scan control signal lines and one of the eighth scan control signal lines, each sixth scan control signal line is coupled to the third control signal terminals of the pixel circuits in the corresponding row of sub-pixels, each seventh scan control signal line is coupled to the second control signal terminals of the pixel circuits in the corresponding row of sub-pixels, and each eighth scan control signal line is coupled to the first control signal terminals of the pixel circuits in the corresponding row of sub-pixels;

the driving control circuit comprises: a fifth scan control circuit and a sixth scan control circuit;

the fifth scan control circuit comprises a plurality of fifth scan control shift register units which are arranged in sequence; in every two adjacent rows of sub-pixels, a sixth scan control signal line coupled to a latter row of sub-pixels and a seventh scan control signal line coupled to a former row of sub-pixels are correspondingly coupled to a same fifth scan control shift register unit; and the sixth scan control circuit comprises a plurality of sixth scan control shift register units which are arranged in sequence; an eighth scan control signal line coupled to each row of sub-pixels is correspondingly coupled to one of the sixth scan control shift register units.

18. The display panel according to claim 17, wherein the plurality of control signal lines further comprises a plurality of twelfth scan control signal lines; each row of sub-pixels corresponds to one of the twelfth scan control signal lines, each twelfth scan control signal line is coupled to the fourth control signal terminals of the pixel circuits in the corresponding row of sub-pixels; and the driving control circuit comprises an eighth scan control circuit comprising a plurality of eighth scan control shift register units which are sequentially arranged; a twelfth scan control signal line coupled to each row of sub-pixels is correspondingly coupled to one of the eighth scan control shift register units.

19. The display panel according to claim 17, wherein the plurality of control signal lines further comprises a plurality of ninth scan control signal lines, a plurality of tenth scan control signal lines, and a plurality of eleventh scan control signal lines; each row of sub-pixels corresponds to one of the ninth scan control signal lines, one of the tenth scan control signal lines and one of the eleventh scan control signal lines, each ninth scan control signal line is coupled to the third control signal terminals of the pixel circuits in the corresponding row of sub-pixels, each tenth scan control signal line is coupled to the second control signal terminals of the pixel circuits in the corresponding row of sub-pixels, and each eleventh scan control signal line is coupled to the first control signal terminals of the pixel circuits in the corresponding row of sub-pixels; and the driving control circuit comprises a seventh scan control circuit comprising a plurality of seventh scan control shift register units which are sequentially arranged; in every two adjacent rows of sub-pixels, a ninth scan control signal line coupled to a latter row of sub-pixels and a tenth scan control signal line coupled to a former row of sub-pixels are correspondingly coupled to a same seventh scan control shift register unit, and a tenth scan control signal line coupled to the latter row of sub-pixels and an eleventh scan control signal line coupled to the former row of sub-pixels are correspondingly coupled to a same seventh scan control shift register unit.

* * * * *